United States Patent
Akkarakaran et al.

(10) Patent No.: US 10,568,092 B2
(45) Date of Patent: Feb. 18, 2020

(54) SCHEDULING AND/OR SCHEDULING CONFIGURATION

(71) Applicant: QUALCOMM Incorporated, San Diego, CA (US)

(72) Inventors: Sony Akkarakaran, Poway, CA (US); Wanshi Chen, San Diego, CA (US); Tao Luo, San Diego, CA (US); Hao Xu, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 15/897,999

(22) Filed: Feb. 15, 2018

(65) Prior Publication Data

US 2018/0242319 A1    Aug. 23, 2018

Related U.S. Application Data

(60) Provisional application No. 62/460,694, filed on Feb. 17, 2017.

(51) Int. Cl.
| | |
|---|---|
| *H04W 72/04* | (2009.01) |
| *H04W 8/24* | (2009.01) |
| *H04W 52/02* | (2009.01) |
| *H04W 72/12* | (2009.01) |
| *H04L 5/00* | (2006.01) |
| *H04L 1/18* | (2006.01) |

(52) U.S. Cl.
CPC ....... *H04W 72/0446* (2013.01); *H04L 5/0053* (2013.01); *H04W 8/24* (2013.01); *H04W 52/0216* (2013.01); *H04W 52/0219* (2013.01); *H04W 72/042* (2013.01); *H04W 72/12* (2013.01); *H04L 1/1812* (2013.01); *H04L 5/0007* (2013.01); *H04L 5/0051* (2013.01); *H04W 72/048* (2013.01)

(58) Field of Classification Search
None
See application file for complete search history.

(56) References Cited

U.S. PATENT DOCUMENTS

| | | | | |
|---|---|---|---|---|
| 2009/0011783 A1* | 1/2009 | Kitazoe | ................... | H04W 8/22 455/517 |
| 2010/0173639 A1* | 7/2010 | Li | ........................ | H04B 7/0695 455/450 |

(Continued)

*Primary Examiner* — James P Duffy
(74) *Attorney, Agent, or Firm* — Holland & Hart LLP

(57) ABSTRACT

Methods, systems, and devices for wireless communication are described for improved scheduling and/or scheduling configuration. A base station may receive, from a user equipment (UE), an indication of one or more UE capabilities. The base station may determine, based on the one or more UE capabilities, when a grant to be transmitted is usable by the UE. The base station may transmit the grant to the UE, the grant including an assignment of resources based on when the grant is usable. In some examples, a UE may identify one or more UE capabilities in association with different grant characteristics and transmit, to a base station, an indication of the one or more UE capabilities. The UE may receive, from the base station, a grant having one of the different grant characteristics and including an assignment of resources, the assignment of resources based on the one or more UE capabilities.

28 Claims, 22 Drawing Sheets

(56) References Cited

U.S. PATENT DOCUMENTS

| | | | |
|---|---|---|---|
| 2013/0028126 A1* | 1/2013 | Kazmi | H04W 24/10 370/252 |
| 2014/0187283 A1* | 7/2014 | Nimbalker | H04W 72/048 455/550.1 |
| 2016/0266634 A1* | 9/2016 | Chuang | H04W 52/0258 |
| 2018/0146410 A1* | 5/2018 | Cho | H04W 48/20 |

* cited by examiner

| UE Capability(ies)/Grant Characteristic(s) Combinations | Index |
|---|---|
| PR1, DC1, BL1, GC1 | 1 |
| PR2, DC2, BL2, GC2 | 2 |
| PR3, DC3, BL3, GC3 | 3 |
| PR4, DC4, BL4, GC3 | 4 |

FIG. 4

| UE Capability(ies)/Time Delay Information Combinations | Index |
|---|---|
| PC1, DC1, BL1, TD1 | 1 |
| PC2, DC2, BL2, TD2 | 2 |
| PC3, DC3, BL3, TD3 | 3 |
| PC4, DC4, BL4, TD3 | 4 |

FIG. 8

SCHEDULING AND/OR SCHEDULING CONFIGURATION

CROSS REFERENCES

The present Application for Patent claims priority to U.S. Provisional Patent Application No. 62/460,694 by Akkarakaran, et al., entitled "Improved Scheduling and/or Scheduling Configuration," filed Feb. 17, 2017, assigned to the assignee hereof.

BACKGROUND

The following relates generally to wireless communication, and more specifically to improved scheduling and/or scheduling configuration.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In many cases, a UE may transmit its capabilities (in the form of UE capability information) to a network. However, wireless technologies have become increasingly more complex and new technological features or capabilities are continually added to UEs. The result has been that UE capabilities can vary widely from UE to UE and within a UE. Moreover, NR systems support very flexible scheduling of UEs, though the scheduling of UEs may be constrained by the UE capabilities. Improved methods of signaling capability information between the base station and the UE are desired.

SUMMARY

The described techniques relate to improved methods, systems, devices, or apparatuses that support techniques for improved scheduling and/or scheduling configuration. Generally, the described techniques provide for efficiently generating resource grants for a user equipment (UE) based on the capabilities of the UE. Described examples include a UE semi-statically indicating to a base station one or more UE capabilities for the base station to use when generating grants for the UE. The UE capabilities may be transmitted to the base station via a capability table which maps the UE capabilities and grant characteristics to an index. The UE may also use a low-signaling overhead mechanism to dynamically indicate changes to the one or more UE capabilities. Additionally, a UE may semi-statically indicate to a base station one or more UE capabilities for the base station to use for determining when to expect the UE to respond to a transmission. With the information of when a UE is able to respond to a transmission, a base station is able to grant resources only during a time when the UE will be able to respond. The techniques may thus efficiently utilize limited system resources.

A method of wireless communication is described. The method may include receiving, from a user equipment (UE), an indication of one or more UE capabilities, determining, based at least in part on the one or more UE capabilities, when a grant to be transmitted by the base station to the UE is usable by the UE, and transmitting the grant to the UE, the grant including an assignment of resources based at least in part on when the grant is usable.

An apparatus for wireless communication is described. The apparatus may include means for receiving, from a UE, an indication of one or more UE capabilities, means for determining, based at least in part on the one or more UE capabilities, when a grant to be transmitted by the base station to the UE is usable by the UE, and means for transmitting the grant to the UE, the grant including an assignment of resources based at least in part on when the grant is usable.

Another apparatus for wireless communication is described. The apparatus may include a processor, memory in electronic communication with the processor, and instructions stored in the memory. The instructions may be operable to cause the processor to receive, from a UE, an indication of one or more UE capabilities, determine, based at least in part on the one or more UE capabilities, when a grant to be transmitted by the base station to the UE is usable by the UE, and transmit the grant to the UE, the grant including an assignment of resources based at least in part on when the grant is usable.

A non-transitory computer readable medium for wireless communication is described. The non-transitory computer-readable medium may include instructions operable to cause a processor to receive, from a UE, an indication of one or more UE capabilities, determine, based at least in part on the one or more UE capabilities, when a grant to be transmitted by the base station to the UE is usable by the UE, and transmit the grant to the UE, the grant including an assignment of resources based at least in part on when the grant is usable.

In some examples of the method, apparatus, and non-transitory computer-readable medium described above, receiving the indication of the one or more UE capabilities further comprises: receiving a capability table from the UE, wherein the capability table maps the one or more UE capabilities and one or more grant characteristics with an index.

Some examples of the method, apparatus, and non-transitory computer-readable medium described above may further include processes, features, means, or instructions for determining a time duration after receipt of the grant in which the grant may be usable by the UE. Some examples of the method, apparatus, and non-transitory computer-readable medium described above may further include processes, features, means, or instructions for selecting the time duration from a plurality of time durations corresponding to different at least one of the one or more UE capabilities or one or more grant characteristics.

Some examples of the method, apparatus, and non-transitory computer-readable medium described above may further include processes, features, means, or instructions for determining a time delay after which the UE is to respond to a downlink (DL) packet associated with the grant.

Some examples of the method, apparatus, and non-transitory computer-readable medium described above may further include processes, features, means, or instructions for determining when the grant may be usable includes determining a time duration after receipt of the grant in which the grant may be usable by the UE, and wherein the time duration may be in terms of at least one of time, one or more mini-slots, one or more slots, or one or more subframes.

Some examples of the method, apparatus, and non-transitory computer-readable medium described above may further include processes, features, means, or instructions for determining when the grant may be usable includes determining a time duration after receipt of the grant in which the grant may be usable by the UE, and wherein determining the time duration comprises identifying the time duration based at least in part on whether the grant includes a beam indication, a beam-change indication, a bandwidth-part indication, a bandwidth-part change indication, or any combination thereof.

Some examples of the method, apparatus, and non-transitory computer-readable medium described above may further include processes, features, means, or instructions for determining when the grant may be usable includes determining a time duration after receipt of the grant in which the grant may be usable by the UE, and wherein determining the time duration comprises identifying the time duration based at least in part on a configuration of a wireless communications frame structure or slot in which the grant may be to be transmitted, a configuration of a predetermined number of wireless communication frame structures or slots which follow transmission of the grant, or combinations thereof.

In some examples of the method, apparatus, and non-transitory computer-readable medium described above, the time duration may be based at least in part on whether the wireless communications frame structure or slot may be of a DL centric configuration or an uplink (UL) centric configuration.

In some examples of the method, apparatus, and non-transitory computer-readable medium described above, the time duration may be based at least in part on whether the wireless communications frame structure or slot includes a predetermined range of orthogonal frequency-division multiplexing (OFDM) symbols for DL control, one or more sounding reference signals (SRSs) at the beginning of an uplink portion of the slot, or combinations thereof.

Some examples of the method, apparatus, and non-transitory computer-readable medium described above may further include processes, features, means, or instructions for receiving the indication of the one or more UE capabilities semi-statically in a UE capability table. Some examples of the method, apparatus, and non-transitory computer-readable medium described above may further include processes, features, means, or instructions for receiving the indication of the one or more UE capabilities dynamically using one or more indices in the UE capability table.

Some examples of the method, apparatus, and non-transitory computer-readable medium described above may further include processes, features, means, or instructions for receiving the indication of the one or more UE capabilities semi-statically in connection with a radio resource control (RRC) connection setup procedure or an RRC reconfiguration procedure.

Some examples of the method, apparatus, and non-transitory computer-readable medium described above may further include processes, features, means, or instructions for receiving the indication of the one or more UE capabilities via an UL control channel from the UE.

In some examples of the method, apparatus, and non-transitory computer-readable medium described above, the indication of the one or more UE capabilities may be based at least in part on a history of at least one of one or more timing adjust durations received by the UE, or one or more hybrid automatic repeat request (HARQ) acknowledgements or negative acknowledgements received by the UE.

In some examples of the method, apparatus, and non-transitory computer-readable medium described above, the indication of the one or more UE capabilities may be based at least in part on one of a processing mode of the UE, available battery power of the UE, or available processing resources of the UE.

In some examples of the method, apparatus, and non-transitory computer-readable medium described above, the processing mode of the UE may be either a low-latency mode or a relaxed-processing mode.

A method of wireless communication is described. The method may include receiving, from UE, an indication of one or more UE capabilities, determining, based at least in part on the one or more UE capabilities, a time delay after which a DL packet or a grant to be transmitted by the base station to the UE is to be responded to by the UE, and transmitting at least one of the DL packet or the grant to the UE based at least in part on the indication of the time delay.

An apparatus for wireless communication is described. The apparatus may include means for receiving, from a UE, an indication of one or more UE capabilities, means for determining, based at least in part on the one or more UE capabilities, a time delay after which a DL packet or a grant to be transmitted by the base station to the UE is to be responded to by the UE, and means for transmitting at least one of the DL packet or the grant to the UE based at least in part on the indication of the time delay.

Another apparatus for wireless communication is described. The apparatus may include a processor, memory in electronic communication with the processor, and instructions stored in the memory. The instructions may be operable to cause the processor to receive, from a UE, an indication of one or more UE capabilities, determine, based at least in part on the one or more UE capabilities, a time delay after which a DL packet or a grant to be transmitted by the base station to the UE is to be responded to by the UE, and transmit at least one of the DL packet or the grant to the UE based at least in part on the indication of the time delay.

A non-transitory computer readable medium for wireless communication is described. The non-transitory computer-readable medium may include instructions operable to cause a processor to receive, from a UE, an indication of one or more UE capabilities, determine, based at least in part on the one or more UE capabilities, a time delay after which a DL packet or a grant to be transmitted by the base station to the UE is to be responded to by the UE, and transmit at least one of the DL packet or the grant to the UE based at least in part on the indication of the time delay.

In some examples of the method, apparatus, and non-transitory computer-readable medium described above, a response by the UE to the DL packet or the grant may be an acknowledgement or a negative acknowledgement.

In some examples of the method, apparatus, and non-transitory computer-readable medium described above, receiving the indication of the one or more UE capabilities further comprises: receiving a capability table from the UE, wherein the capability table maps UE capabilities and transmission delay times with an index.

In some examples of the method, apparatus, and non-transitory computer-readable medium described above, determining the time delay comprises: selecting the time delay in terms of at least one of time, one or more mini-slots, one or more slots, or one or more subframes.

In some examples of the method, apparatus, and non-transitory computer-readable medium described above, determining the time delay comprises: identifying the time delay based at least in part on a configuration of a wireless communications frame structure or slot in which the DL packet or the grant may be to be transmitted, a configuration of a predetermined number of wireless communication frame structures or slots which follow transmission of the grant, or combinations thereof.

In some examples of the method, apparatus, and non-transitory computer-readable medium described above, the time delay may be based at least in part on whether the wireless communications frame structure or slot may be of a DL centric configuration or an UL centric configuration.

In some examples of the method, apparatus, and non-transitory computer-readable medium described above, the time delay may be based on whether the wireless communications frame structure or slot includes a predetermined range of OFDM symbols for DL control, one or more SRSs at the beginning of an uplink portion of the slot, or combinations thereof.

Some examples of the method, apparatus, and non-transitory computer-readable medium described above may further include processes, features, means, or instructions for receiving the indication of the one or more UE capabilities semi-statically in the form of a UE capability table. Some examples of the method, apparatus, and non-transitory computer-readable medium described above may further include processes, features, means, or instructions for receiving the indication of the one or more UE capabilities dynamically using one or more indices in the UE capability table.

Some examples of the method, apparatus, and non-transitory computer-readable medium described above may further include processes, features, means, or instructions for receiving the indication of the one or more UE capabilities semi-statically in connection with RRC connection setup procedure or RRC reconfiguration procedure.

Some examples of the method, apparatus, and non-transitory computer-readable medium described above may further include processes, features, means, or instructions for receiving the indication of the one or more UE capabilities via an UL control channel from the UE.

In some examples of the method, apparatus, and non-transitory computer-readable medium described above, the indication of the one or more UE capabilities may be based at least in part on a history of at least one of one or more timing adjust durations received by the UE, or one or more HARQ acknowledgements or negative acknowledgements received by the UE.

In some examples of the method, apparatus, and non-transitory computer-readable medium described above, the indication of UE capability may be based at least in part on at least one of a processing mode of the UE, available battery power of the UE, or available processing resources of the UE.

In some examples of the method, apparatus, and non-transitory computer-readable medium described above, the processing mode of the UE may be either a low-latency mode or a relaxed-processing mode.

A method of wireless communication is described. The method may include identifying one or more UE capabilities in association with different grant characteristics, transmitting, to a base station, an indication of the one or more UE capabilities, and receiving, from the base station, a grant having one of the different grant characteristics and including an assignment of resources, the assignment of resources based at least in part on the one or more UE capabilities.

An apparatus for wireless communication is described. The apparatus may include means for identifying one or more UE capabilities in association with different grant characteristics, means for transmitting, to a base station, an indication of the one or more UE capabilities, and means for receiving, from the base station, a grant having one of the different grant characteristics and including an assignment of resources, the assignment of resources based at least in part on the one or more UE capabilities.

Another apparatus for wireless communication is described. The apparatus may include a processor, memory in electronic communication with the processor, and instructions stored in the memory. The instructions may be operable to cause the processor to identify one or more UE capabilities in association with different grant characteristics, transmit, to a base station, an indication of the one or more UE capabilities, and receive, from the base station, a grant having one of the different grant characteristics and including an assignment of resources, the assignment of resources based at least in part on the one or more UE capabilities.

A non-transitory computer readable medium for wireless communication is described. The non-transitory computer-readable medium may include instructions operable to cause a processor to identify one or more UE capabilities in association with different grant characteristics, transmit, to a base station, an indication of the one or more UE capabilities, and receive, from the base station, a grant having one of the different grant characteristics and including an assignment of resources, the assignment of resources based at least in part on the one or more UE capabilities.

Some examples of the method, apparatus, and non-transitory computer-readable medium described above may further include processes, features, means, or instructions for building a capability table, wherein the capability table maps UE capabilities and grant characteristics with an index. Some examples of the method, apparatus, and non-transitory computer-readable medium described above may further include processes, features, means, or instructions for transmitting the capability table to the base station as the indication of the UE capability.

In some examples of the method, apparatus, and non-transitory computer-readable medium described above, the capability table includes a time when the UE may be able to process a grant having one or more of the grant characteristics.

In some examples of the method, apparatus, and non-transitory computer-readable medium described above, the different grant characteristics include a beam indication, a beam-change indication, a bandwidth-part indication, a bandwidth-part change indication, or any combination thereof.

In some examples of the method, apparatus, and non-transitory computer-readable medium described above, the different grant characteristics include a configuration of a wireless communications frame structure or slot in which the grant may be to be received.

Some examples of the method, apparatus, and non-transitory computer-readable medium described above may further include processes, features, means, or instructions for transmitting the indication of the one or more UE capabilities semi-statically in the form of a UE capability table. Some examples of the method, apparatus, and non-transitory computer-readable medium described above may further include processes, features, means, or instructions for transmitting the indication of the one or more UE capabilities dynamically using one or more indices in the UE capability table.

Some examples of the method, apparatus, and non-transitory computer-readable medium described above may further include processes, features, means, or instructions for transmitting the indication of the one or more UE capabilities semi-statically in connection with RRC connection setup procedure or RRC reconfiguration procedure.

Some examples of the method, apparatus, and non-transitory computer-readable medium described above may further include processes, features, means, or instructions for transmitting the indication of the one or more UE capabilities via an UL control channel from the UE.

In some examples of the method, apparatus, and non-transitory computer-readable medium described above, the indication of the one or more UE capabilities may be based at least in part on a history of at least one of one or more timing adjust durations received by the UE, or one or more HARQ acknowledgements or negative acknowledgements received by the UE.

In some examples of the method, apparatus, and non-transitory computer-readable medium described above, the indication of the one or more UE capabilities may be based on at least one of a processing mode of the UE, available battery power of the UE, or available processing resources of the UE.

In the examples of the method, apparatus, and non-transitory computer-readable medium described herein, the scope of the claims may include specific combinations, and other combinations are also within the scope of the disclosure and appended claims. In the appended claim set, any of the dependent claims may depend on any other dependent claim in any combination. For example, the feature of receiving a capability table from the UE, wherein the capability table maps the one or more UE capabilities and one or more grant characteristics with an index may be combined with the feature of determining a time delay after which a DL packet or a grant to be transmitted by the base station to the UE is to be responded to by the UE. Other examples of claim features that may be combined may exist and are contemplated as being within the scope of the appended claims.

In some examples of the method, apparatus, and non-transitory computer-readable medium described above, the processing mode of the UE may be either a low-latency mode or a relaxed-processing mode.

In some examples, the method, apparatus, and non-transitory computer-readable medium described herein, may include receiving, from a UE, an indication of one or more UE capabilities, determining, based at least in part on the one or more UE capabilities, when a grant to be transmitted by the base station to the UE is usable by the UE, and transmitting the grant to the UE, the grant including an assignment of resources based at least in part on when the grant is usable and these functions may be performed in any combination with one or more of receiving a capability table from the UE, wherein the capability table maps the one or more UE capabilities and one or more grant characteristics with an index, determining when the grant is usable includes determining a time duration after receipt of the grant in which the grant is usable by the UE, selecting the time duration from a plurality of time durations corresponding to different at least one of the one or more UE capabilities or one or more grant characteristics, wherein determining when the grant is usable includes determining a time delay after which the grant or a DL packet associated with the grant is to be responded to by the UE, wherein determining when the grant is usable includes determining a time duration after receipt of the grant in which the grant is usable by the UE, wherein the time duration is in terms of at least one of time, one or more mini-slots, one or more slots, or one or more subframes, wherein determining when the grant is usable includes determining a time duration after receipt of the grant in which the grant is usable by the UE, wherein determining the time duration comprises identifying the time duration based at least in part on whether the grant includes a beam indication, a beam-change indication, a bandwidth-part indication, a bandwidth-part change indication, or any combination thereof, wherein determining when the grant is usable includes determining a time duration after receipt of the grant in which the grant is usable by the UE, and wherein determining the time duration comprises identifying the time duration based at least in part on a configuration of a wireless communications frame structure or slot in which the grant is to be transmitted, a configuration of a predetermined number of wireless communication frame structures or slots which follow transmission of the grant, or combinations thereof, wherein the time duration is based at least in part on whether the wireless communications frame structure or slot is of a DL centric configuration or an UL centric configuration, wherein the time duration is based at least in part on whether the wireless communications frame structure or slot includes a predetermined range of OFDM symbols for DL control, one or more SRSs at the beginning of an uplink portion of the slot, or combinations thereof, receiving the indication of the one or more UE capabilities semi-statically in a UE capability table, receiving the indication of the one or more UE capabilities dynamically using one or more indices in the UE capability table, receiving the indication of the one or more UE capabilities semi-statically in connection with a RRC connection setup procedure or an RRC reconfiguration procedure, receiving the indication of the one or more UE capabilities dynamically via an UL control channel from the UE, wherein the indication of the one or more UE capabilities is based at least in part on a history of at least one of one or more timing adjust durations received by the UE, or one or more HARQ acknowledgements or negative acknowledgements received by the UE, wherein the indication of the one or more UE capabilities is based at least in part on one of a processing mode of the UE, available battery power of the UE, or available processing resources of the UE, wherein the processing mode of the UE is either a low-latency mode or a relaxed-processing mode, and these functions may be performed in any combination.

In some examples, the method, apparatus, and non-transitory computer-readable medium described herein, may include identifying one or more UE capabilities in association with different grant characteristics, transmitting, to a base station, an indication of the one or more UE capabilities, and receiving, from the base station, a grant having one of the different grant characteristics and including an assignment of resources, the assignment of resources based at least in part on the one or more UE capabilities, and these functions may be performed in any combination with one or more of building a capability table, wherein the capability table maps UE capabilities and grant characteristics with an index, transmitting the capability table to the base station as the indication of a UE capability, wherein the capability table includes a time when the UE is able to process a grant having one or more of the grant characteristics, wherein the different grant characteristics include whether the grant includes a timing adjustment to be applied by the UE, wherein the different grant characteristics include a configuration of a wireless communications frame structure or slot in which the grant is to be received, transmitting the indication of the one or more UE capabilities semi-statically in a form of a UE capability table, transmitting the indication of the one or more UE capabilities dynamically using one or more indices in the UE capability table, transmitting the indication of the one or more UE capabilities semi-statically in connection with RRC connection setup procedure or RRC reconfiguration procedure, transmitting the indication of the one or more UE capabilities dynamically via an UL control channel from the UE, wherein the indication of the one or more UE capabilities is based at least in part on a history of at least one of one or more timing adjust durations received by the UE, or one or more HARQ acknowledgements or negative acknowledgements received by the UE, wherein the indication of the one or more UE capabilities is based on at least one of a processing mode of the UE, available battery power of the UE, or available processing resources of the UE, wherein the processing mode of the UE is either a low-latency mode or a relaxed-processing mode, and these functions may be performed in any combination.

In some examples, the method, apparatus, and non-transitory computer-readable medium described herein, the scope of the claims may include receiving, from a UE, an indication of one or more UE capabilities, determining, based at least in part on the one or more UE capabilities, a time delay after which a DL packet or a grant to be transmitted by the base station to the UE is to be responded to by the UE, and transmitting at least one of the DL packet or the grant to the UE based at least in part on the indication of the time delay, and these functions may be performed in any combination with one or more of a response by the UE to the DL packet or the grant being an acknowledgement or a negative acknowledgement, where receiving the indication of the one or more UE capabilities further comprises: receiving a capability table from the UE, wherein the capability table maps UE capabilities and transmission delay times with an index, wherein determining the time delay comprises selecting the time delay in terms of at least one of time, one or more mini-slots, one or more slots, or one or more subframes, wherein determining the time delay comprises identifying the time delay based at least in part on a configuration of a wireless communications frame structure or slot in which the DL packet or the grant is to be transmitted, a configuration of a predetermined number of wireless communication frame structures or slots which follow transmission of the grant, or combinations thereof, wherein the time delay is based at least in part on whether the wireless communications frame structure or slot is of a DL centric configuration or an UL centric configuration, wherein the time delay is based on whether the wireless communications frame structure or slot includes a predetermined range of OFDM symbols for DL control, one or more SRSs at the beginning of an uplink portion of the slot, or combinations thereof, receiving the indication of the one or more UE capabilities semi-statically in the form of a UE capability table, receiving the indication of the one or more UE capabilities dynamically using one or more indices in the UE capability table, receiving the indication of the one or more UE capabilities semi-statically in connection with RRC connection setup procedure or RRC reconfiguration procedure, receiving the indication of the one or more UE capabilities dynamically via an UL control channel from the UE, wherein the indication of the one or more UE capabilities is based at least in part on a history of at least one of one or more timing adjust durations received by the UE, or one or more HARQ acknowledgements or negative acknowledgements received by the UE, wherein the indication of UE capability is based at least in part on at least one of a processing mode of the UE, available battery power of the UE, or available processing resources of the UE, wherein the processing mode of the UE is either a low-latency mode or a relaxed-processing mode, and these functions may be performed in any combination.

BRIEF DESCRIPTION OF THE DRAWINGS

FIG. 4 illustrates an example of a capability table that supports improved scheduling and/or scheduling configuration in accordance with aspects of the present disclosure.

FIG. 8 illustrates an example of a capability table that supports improved scheduling and/or scheduling configuration in accordance with aspects of the present disclosure.

DETAILED DESCRIPTION

The described techniques relate to improved methods, systems, devices, or apparatuses that support techniques for improved scheduling and/or scheduling configuration. The described techniques provide for efficiently generating resource grants for a user equipment (UE) based on the capabilities of the UE. In an example, a base station may receive from a UE an indication of UE capabilities. From the indication, the base station may determine when a grant for resources may be utilized by the UE. From this determination, the base station may assign system resources to the UE only during a time when the UE is able to utilize the system resources.

Conventional techniques fail to adequately account for UE capabilities when scheduling in New Radio (NR) systems that support flexible scheduling. A NR base station is permitted to schedule uplink and downlink transmissions in, for example, slots, mini-slots, subframes, frames, and/or the like, within a time interval. Moreover, NR systems support variable timing for sending hybrid automatic repeat request (HARM) acknowledgements. UEs, however, may have different capabilities, and a particular UE may not support all of the different ways in which it may be scheduled. Moreover, capabilities of a UE may vary over time and depend on a number of factors, including current conditions of a wireless channel, a current battery level of the UE, current availability of processing resources of the UE, or the like, or any combination thereof.

The example embodiments overcome the deficiencies in conventional systems by allowing for a UE to semi-statically indicate to a base station one or more UE capabilities for the base station to use when generating grants for the UE. Additionally or alternatively, the UE may use a low-signaling overhead mechanism to dynamically indicate changes to the one or more UE capabilities. Additionally or alternatively, a UE may semi-statically indicate to a base station one or more UE capabilities for the base station to use for determining when to expect the UE to respond to a transmission.

Aspects of the disclosure are initially described in the context of a wireless communications system. The wireless communications system provide semi-static and dynamic capability indication for efficient scheduling of resources and generating grants. Aspects of the disclosure are further illustrated by and described with reference to apparatus diagrams, system diagrams, and flowcharts that relate to improved scheduling and/or scheduling configuration.

Figure 1:
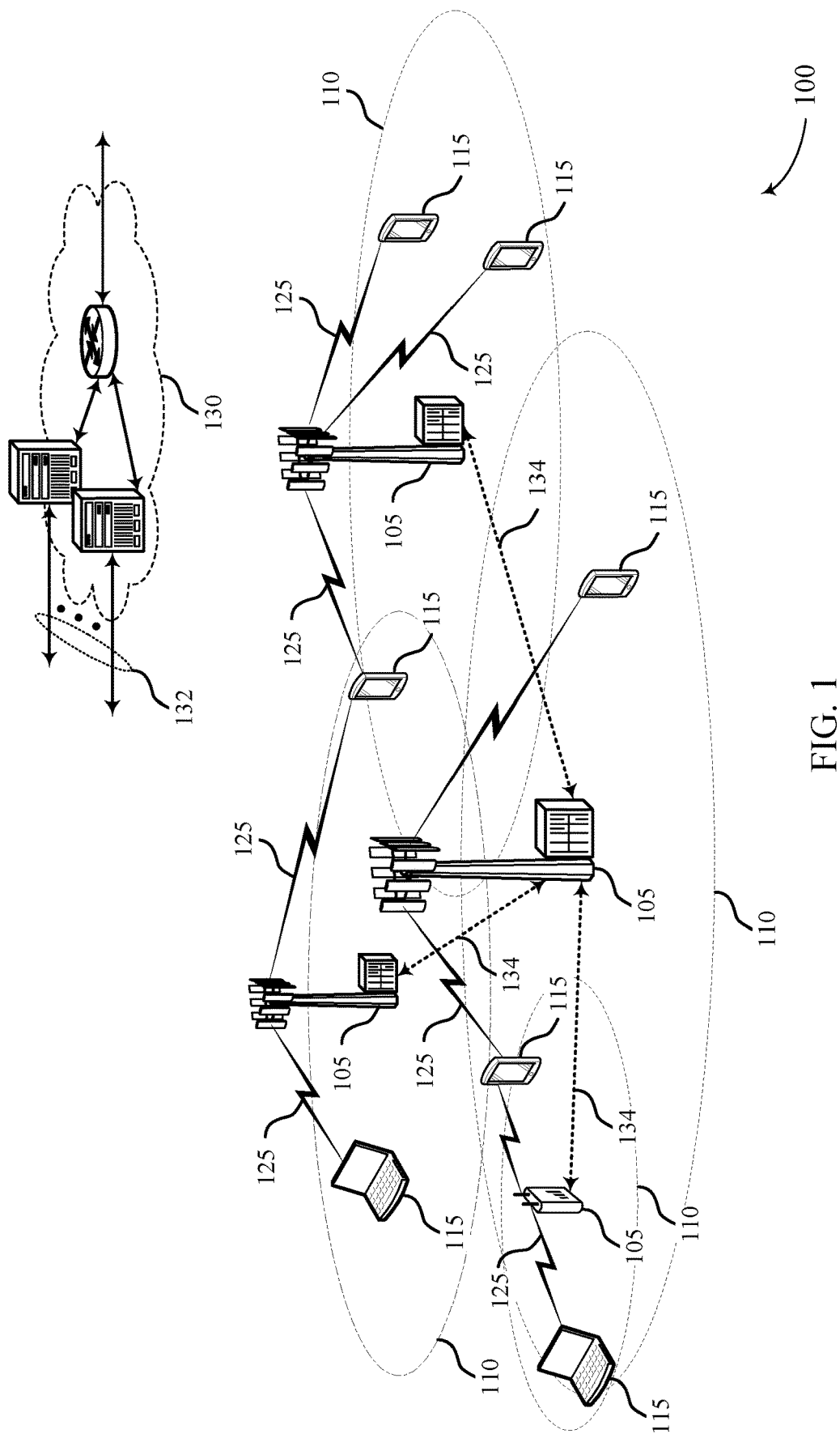
FIG. 1 illustrates an example of a system for wireless communication that supports improved scheduling and/or scheduling configuration in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

A base station 105 and a UE 115 may use a connection setup procedure to establish a connection for wireless communication (e.g., radio resource control (RRC) connection setup procedure). The base station 105 and the UE 115 optionally may perform a connection reconfiguration procedure (e.g., a RRC reconfiguration procedure) to modify the established connection. During the connection setup procedure, the connection reconfiguration procedure, and/or the like, the UE 115 may inform the base station 105 of one or more UE capabilities. In an example, the UE 115 may provide an indication to the base station 105 that includes a capability table. The capability table may include one or more capabilities of the UE 115 that the base station 105 may use when generating grants for the UE 115. The base station 105 may process the UE capabilities to determine when the UE 115 is capable of acting on a grant (e.g., after receipt of the grant by the UE 115 or transmission by the base station 105). Moreover, the base station 105 may process the UE capabilities to determine when to expect the UE 115 to respond to a transmission (e.g., a HARQ ACK).

The capability table may provide a low-signaling overhead mechanism to enable the UE 115 to dynamically indicate changes to the one or more UE capabilities. The capability table may list one or more combinations of one or more UE capabilities and one or more grant characteristics mapped to an index. Rather than resending the capability table, updated capabilities, an association between UE capabilities and grant characteristics, or any combination thereof, the UE 115 may send the index in an indication to dynamically indicate changes to the one or more UE capabilities. The index may be relatively small and may be as small as one or more bits. The base station 105 may receive an indication from the UE 115 including the index, and may use the one or more UE capabilities corresponding to the index for generating grants and establishing a timeframe of when to expect a reply from the UE 115.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, and/or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, and/or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower.

In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a network device 105-c, network device 105-a, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs). In some examples, a subframe may span a duration in time and may be referred to as a slot, a mini slot, a time period, a TTI, or any other term used to describe a time interval. The subframe (or slot, mini slot, TTI, etc.) may be a unit of scheduling. In some examples, the subframe (also referred to as slot, mini slot, TTI, etc.) may be used to define timing boundaries. In some examples, the subframe (or slot, mini slot, TTI, etc.) may include 7, 14 or 28 symbols. In some examples, the subframe may include one or more slots, each of which may include multiple symbols that may be the smallest unit of scheduling. In other cases, the subframe or any other time duration may be the smallest unit of scheduling.

A resource element may consist of one symbol period and one subcarrier (e.g., a 15 KHz frequency range). A resource block may contain 12 consecutive subcarriers in the frequency domain and, for a normal cyclic prefix in each orthogonal frequency-division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplex (FDD) and time division duplex (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

The example embodiments permit a UE to semi-statically indicate to a base station one or more UE capabilities and provide a low-signaling overhead mechanism to enable the UE to dynamically signal changes to the one or more UE capabilities.

Figure 2:
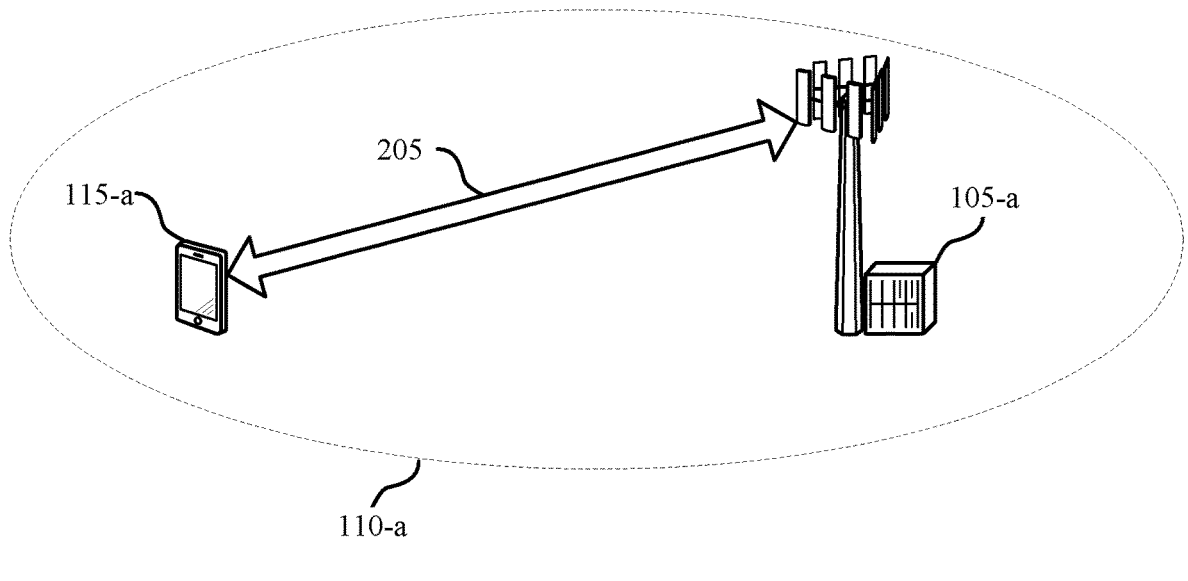
FIG. 2 illustrates an example of a wireless communication system that supports improved scheduling and/or scheduling configuration in accordance with aspects of the present disclosure.

FIG. 2 illustrates an example of a wireless communication system 200 that supports improved scheduling and/or scheduling configuration in accordance with various aspects of the present disclosure. Wireless communications system 200 may include a base station 105-a and a UE 115-a, which may be examples of the corresponding devices described with reference to FIG. 1. UE 115-a and base station 105-a may communicate via bidirectional link 205 within coverage area 110-a. In some cases, bidirectional link 205 may be used for establishing an RRC connection.

UE 115-a may transmit a capability table to the base station 105-a to inform it of one or more UE capabilities. The capability table may be transmitted semi-statically, for example, when the UE 115-a and the base station 105-a perform a set up procedure, such as an RRC connection setup procedure, to establish a connection. In another example, the capability table may be transmitted when the UE 115-a and the base station 105-a perform a connection reconfiguration procedure, such as a RRC reconfiguration procedure. The capability table may map an index to one or more capabilities of the UE 115-a and one or more grant characteristics. The base station 105-a may select a grant having one or more grant characteristics, and may process the capability table to identify one or more UE capabilities corresponding to the one or more grant characteristics.

At some time, the base station 105-a may transmit a grant to the UE 115-a, and the grant may include an assignment of resources to the UE 115-a based at least in part on when the grant is usable by the UE 115-a. For example, the base station 105-a may determine that it will take the UE 115-a a time duration to decode the grant, and the base station 105-a may only assign, for example, resources to the UE 115-a for uplink transmission subsequent to the time duration after the UE 115-a receives the grant. In further examples, the base station 105-a may determine a time delay after which a downlink (DL) packet to be transmitted by the base station 105-a to the UE 115-a is to be responded to by the UE 115-a. For example, the base station 105-a may process the one or more capabilities to determine how long the UE 115-a will need to decode a DL packet and respond with an acknowledgment (e.g., HARQ ACK/NACK). In further examples, the base station 105-a may determine a minimum amount of processing time needed by the UE 115-a to process and use a grant if the UE is monitoring a downlink control channel (e.g., a Physical Downlink Control Channel (PDCCH), a downlink data channel (e.g., a Physical Downlink Shard Channel (PDSCH)), or both.

In some examples, the base station 105-a may transmit the grant on a downlink control channel (e.g., PDCCH) within a TTI that includes a resource assignment for the UE 115-a. The resource assignment may allocate DL or UL resources to the UE 115-a within that same TTI or in a different TTI. If in the same TTI, the UE 115-a may need to process the grant quickly to start decoding the DL resources or transmitting using the UL resources. For example, the UE 115-a may buffer some or all DL data in some or all downlink sub-time intervals of the TTI while decoding a control channel of the TTI looking for a grant addressed to the UE 115-a. The grant may inform the UE 115-a which portion of the downlink sub-time intervals the UE 115-a is to decode (e.g., which resource elements (REs), mini-slots, slots, frames, etc. within the TTI are addressed to the UE). The UE 115-a may discard buffered DL data from the downlink sub-time intervals that is not addressed to the UE 115-a.

In some instances, the UE 115-a may be preconfigured to start transmitting a demodulation reference signal (DMRS) or a sounding reference signal (SRS) on an UL control channel of the TTI even before the UE 115-a completes decoding of a downlink control channel of the TTI. The downlink control channel may include parameters for UL transmission, including modulation order, rank, or the like. In some cases, the grant may also include a timing-adjust command. A timing adjustment may correspond to an amount of time a signal takes to wirelessly propagate between the base station 105-a and the UE 115-a, and the timing adjustment command may instruct the UE 115-a to adjust its timing based at least in part on a current relative distance between the base station 105-a and the UE 115-a.

Conventional solutions may be problematic if the UE 115-a does not adjust its timing prior to transmitting the DMRS or SRS, and may impact the ability of the base station 105-a to receive UL data transmitted by the UE 115-a. The timing adjust command may also indicate a need for the UE 115-a to adjust downlink timing-tracking, which may rely on PDCCH decoding, so as to receive the grant. The example embodiments may overcome these and other issues by permitting a UE to semi-statically indicate to a base station one or more UE capabilities and provide a low-signaling overhead mechanism to enable the UE to dynamically indicate changes to the one or more UE capabilities.

Figure 3:
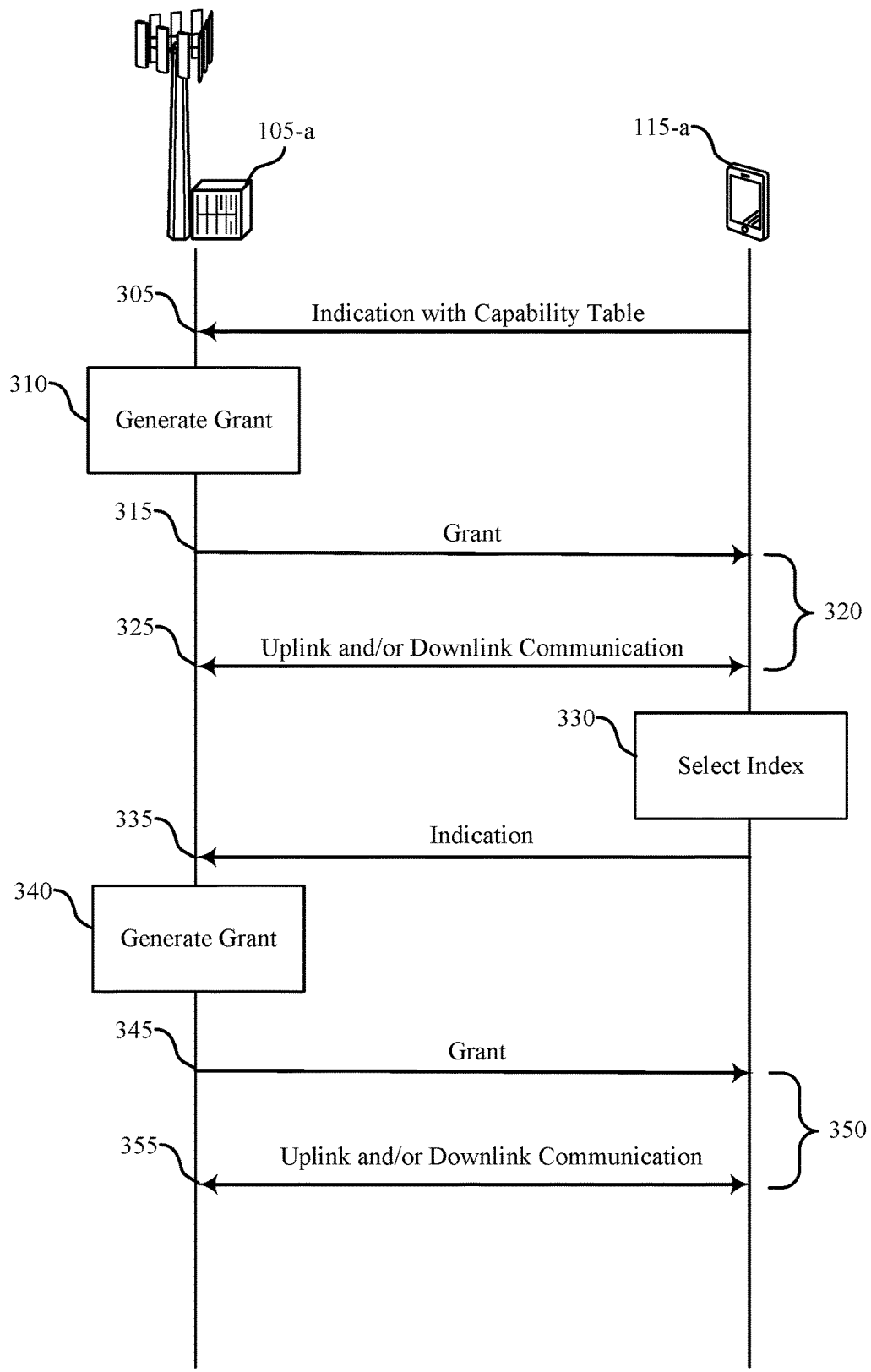
FIG. 3 illustrates an example of a process flow that supports improved scheduling and/or scheduling configuration in accordance with aspects of the present disclosure.

FIG. 3 illustrates an example of a process flow 300 that supports improved scheduling and/or scheduling configuration in accordance with various aspects of the present disclosure. At some time, the UE 115-a may build a capability table that it may provide to a base station 105-a to inform the base station 105-a of one or more UE capabilities associated with one or more grant characteristics. For example, the base station 105-a may send five different types of grants, and the capability table may indicate one or more capabilities for each grant type. The UE 115-a may provide the capability table to the base station 105-a during a connection setup procedure for establishing a connection with the base station 105-a. The UE 115-a optionally may provide the capability table to the base station 105-a when a connection reconfiguration procedure is performed to modify the established connection.

The process flow 300 may begin at 305. At 305, the UE 115-a may transmit an indication that includes the capability table to the base station 105-a. The capability table may include a set of one or more UE capabilities associated with one or more grant characteristics, and each combination of a UE capability set and one or more grant characteristics may be mapped to an index. FIG. 4 illustrates an example of a capability table 400 that supports improved scheduling and/or scheduling configuration in accordance with various aspects of the present disclosure. In the depicted example, the capability table 400 may include rows 420-a to 420-d that list combinations 410 of a set of one or more UE capabilities and one or more grant characteristics mapped to an index 405. Examples of UE capabilities include available processing resources (PR), decoding capabilities (DC), battery level (BL), Mode (M), and/or the like. Available processing resources may list what level of computational resources the UE 115-a has available to process of a grant having a set of one or more characteristics. For example, the UE 115-a may have less processing resources for a first base station due to concurrent processing, for example, associated with another base station (e.g., corresponding to another radio access technology (RAT)).

Decoding capabilities may indicate how quickly the UE 115-*a* is able to decode received data. Battery level may indicate an amount of battery charge of the UE 115-*a* and may correspond to a range. A UE 115-*a* may operate in different processing modes, including, for example, a low-latency mode or a relaxed-processing mode. Low-latency mode is where the UE 115-*a* allocates processing resources attempting to reduce and/or minimize latency. In a relaxed-processing mode, UE 115-*a* allocates processing resources to some other process and/or to conserve its battery. The list combinations 410 may also identify a time when the UE 115-*a* is able to process a grant having one or more of the grant characteristics.

Examples of grant characteristics (GCs) may include a size of the grant, a number of symbols required to transport the grant, a configuration of a wireless communications frame structure or slot in which the grant is to be received, a configuration of communication frame structures or slots which follow transmission of the grant, whether the grant includes a timing adjustment to be applied to the UE, a beam indication, a beam-change indication, a bandwidth-part indication, a bandwidth-part change indication, and/or the like, or any combination thereof. In an example, the configuration may be a DL centric configuration or an UL centric configuration. The DL centric configuration may indicate the wireless communications frame structure or slot that is primarily used to transport downlink data. The UL centric configuration may indicate the wireless communications frame structure or slot that is primarily used to transport uplink data.

The UE 115-*a* may build and/or update the capability table 400 over time, and may transmit the capability table 400 in its entirety or updates thereto to the base station 105-*a*. As UE capabilities may vary over time, the UE 115-*a* may dynamically signal an indication that identifies which index or indices of the capabilities table are currently active, and which are not currently active but could be activated by the UE 115-*a*. For example, the UE 115-*a* may make available different UE capabilities based at least in part on its current processing load, battery level, and/or the like. For a grant having a particular set of one or more characteristics, the UE 115-*a* may provide a first set of one or more capabilities when a current processing load is low, and a second set of one or more capabilities when a current processing load is high.

The base station 105-*a* may receive and store the capability table 400. The base station 105-*a* may use the capability table when generating a grant for the UE 115-*a*. Referring again to FIG. 3, at 310, the base station 105-*a* may generate a grant for the UE 115-*a*. The grant may assign resources of the TTI to the UE 115-*a* for uplink and/or downlink communication. When generating the grant, the base station 105-*a* may determine one or more characteristics of the grant to be generated and access a capability table of the UE to which the grant is being sent. The base station 105-*a* may then identify one or more UE capabilities from the capability table 400 that correspond with the one or more characteristics of the grant to be generated. The base station 105-*a* may then select an assignment of resources for the UE 115-*a*. The selected resources may be downlink resources, uplink resources, or both, and the selection may be based at least in part on when the grant is usable by the UE 115-*a*. The base station 105-*a* may process the UE capabilities for estimating how long it will take for the UE 115-*a* to decode the grant and to take an action after receipt of the grant. The base station 105-*a* may avoid allocating resources of the TTI (or a subsequent TTI) to the UE 115-*a* before the UE 115-*a* is able to use those resources. The base station 105-*a* may also avoid expecting that the UE 115-*a* respond before the UE 115-*a* is capable of responding.

Figure 5:
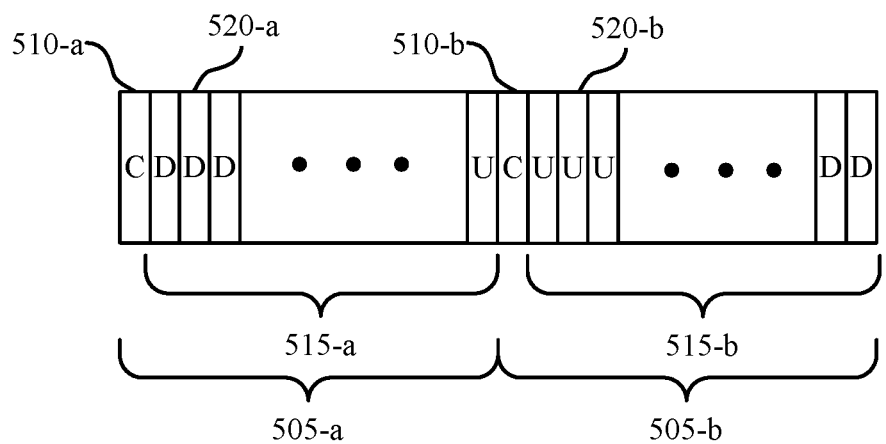
FIG. 5 illustrates an example of transmission time intervals that support improved scheduling and/or scheduling configuration in accordance with aspects of the present disclosure.

In an example, the base station 105-*a* and the UE 115-*a* may communicate in transmission time intervals (TTIs) and the base station 105-*a* may allocate resources of the TTIs to the UE 115-*a* or to other UEs. FIG. 5 illustrates an example diagram 500 of transmission time intervals including wireless communications frame structures that support improved scheduling and/or scheduling configuration in accordance with various aspects of the present disclosure. A TTI may correspond to a set of time and frequency resources within a wireless communication channel that may be used for communication of control, uplink, and/or downlink data. FIG. 5 depicts a downlink centric TTI 505-*a* and an uplink centric TTI 505-*b*. Only two TTIs are shown, and TTIs may repeat for a predetermined time period or indefinitely. The base station 105-*a* may assign a portion of each TTI 505 to one or more UEs.

A TTI 505 may include a control channel 510 and a data channel 515. The control channel 510 may include one or more grants to inform one or more UEs if they have been assigned any portion of a TTI 505. For example, a TTI 505 may include one or more sub-time intervals 520. A sub-time interval may be a slot, a mini-slot, a subframe, and/or the like. A grant may inform a UE which sub-time intervals within the TTI have been allocated to the UE. A sub-time interval transporting data from the base station 105-*a* to the UE 115-*a* is referred to herein as a downlink sub-time interval, and a sub-time interval transporting data from the UE 115-*a* to the base station 105-*a* is referred to herein as an uplink sub-time interval. In some examples, all sub-time intervals of a TTI may be downlink sub-time intervals. In other examples, all sub-time intervals of a TTI may be uplink sub-time intervals. In further examples, a TTI may include both uplink and downlink sub-time intervals.

A TTI carrying more uplink than downlink sub-time intervals is referred to as being uplink centric, and a TTI carrying more downlink than uplink sub-time intervals is referred to as being downlink centric. A guard band may be used when transitioning from an uplink sub-time interval to a downlink sub-time interval, and when transitioning from a downlink sub-time interval to an uplink sub-time interval. In some instances, TTIs may alternate between downlink centric TTIs and uplink centric TTIs. In other examples, the base station 105-*a* may perform traffic management and signal to the UEs an unequal distribution of downlink centric TTIs and uplink centric TTIs. For example, when uplink traffic is heavier than downlink, the base station 105-*a* may allocate a greater number of uplink centric TTIs than downlink centric TTIs. Conversely, when downlink traffic is heavier than uplink, the base station 105-*a* may allocate a greater number of downlink centric TTIs than uplink centric TTIs.

When generating a grant to assign resources to the UE 115-*a*, the base station 105-*a* may use the one or more characteristics of the grant to be transmitted and the one or more capabilities of the UE 115-*a* specified in the capability table to determine when the UE 115-*a* is able to use the grant. For example, in NR systems, TTIs may have a relatively short time duration. The base station 105-*a* desires to avoid assigning resources to the UE 115-*a* that the UE 115-*a* is unable to use because the UE 115-*a* has not yet completed processing of the grant assigning those resources. For example, base station 105-*a* may know a current duration of a TTI and whether the UE 115-*a* is capable of decoding a grant in the TTI and transmitting in an uplink sub-time interval of that same TTI. If the UE 115-*a* cannot, it was wasteful to assign an uplink sub-time interval to the UE 115-*a* in that TTI because the uplink sub-time interval will go unused.

Figure 6A:
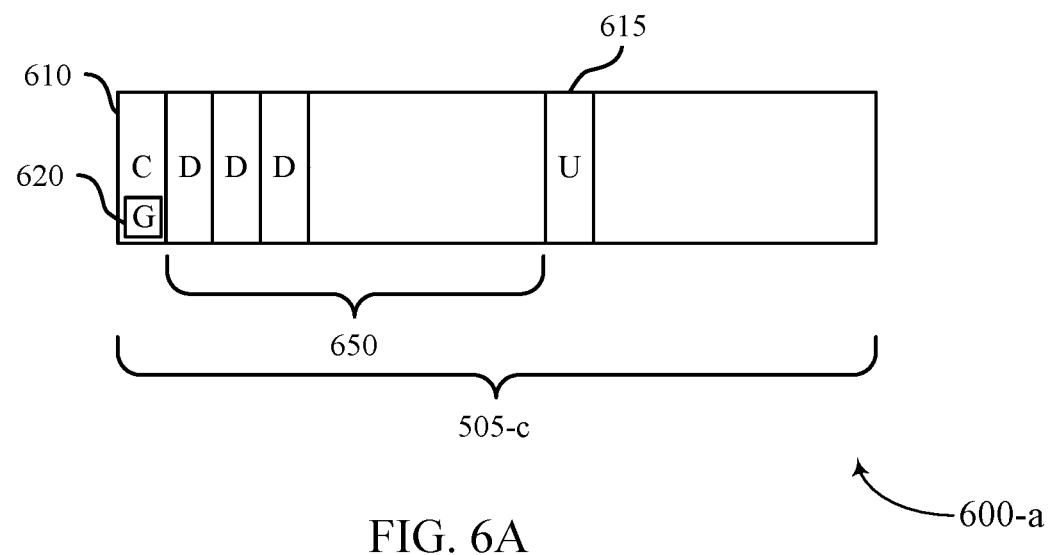
FIGS. 6A-6B illustrate examples of a time duration relative to transmission time intervals that support improved scheduling and/or scheduling configuration in accordance with aspects of the present disclosure.
Figure 6B:
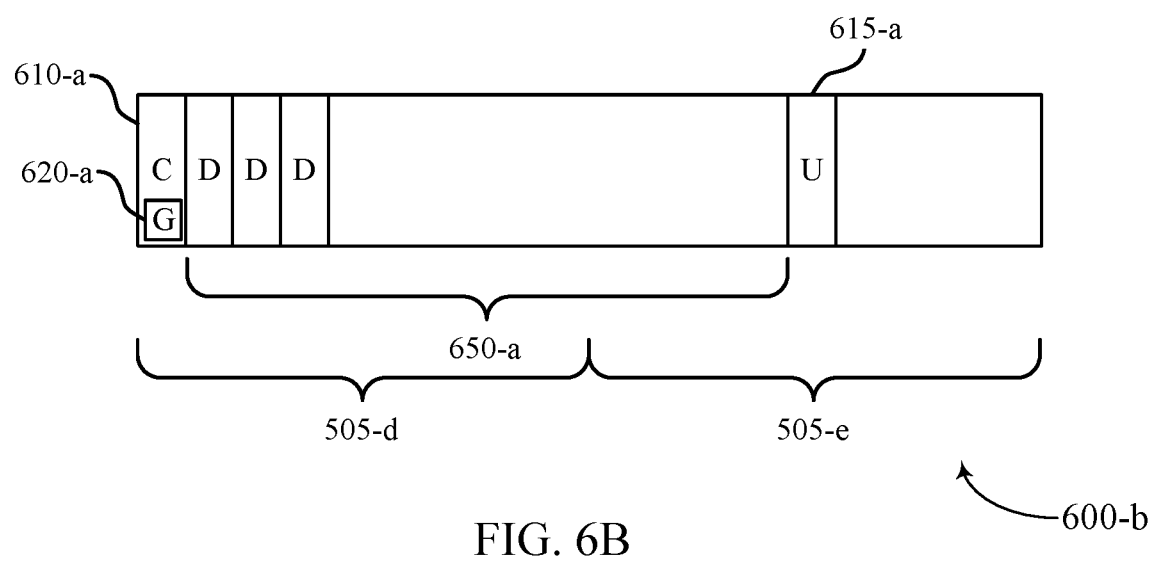

FIGS. 6A-6B illustrate example diagrams 600-*a*, 600-*b* of a time duration that supports improved scheduling and/or scheduling configuration in accordance with various aspects of the present disclosure. FIG. 6A depicts a single TTI 505-*c* with a control channel 610 including a grant 620 for UE 115-*a* that allocates an uplink sub-time interval 615 to the UE 115-*a*. In this example, the base station 105-*a* determines a time duration 650 after which the grant is usable by the UE 115-*a* based at least in part on the one or more UE capabilities or one or more characteristics of the grant. In this example, the time duration 650 is shorter in time than a duration of TTI 505-*c*, and hence the base station 105-*a* is able to assign to the UE 115-*a* uplink sub-time intervals within the same TTI 505-*c* in which the grant 620 is transmitted, so long as the uplink sub-time intervals occur after time duration 650.

In other examples, the base station 105-*a* may determine that the UE 115-*a* is unable to use the grant within the same TTI, as shown in FIG. 6B. FIG. 6B depicts consecutive TTIs 505-*d*, 505-*e*. TTI 505-*d* includes a control channel 610-*a* having a grant 620-*a* for UE 115-*a* that allocates an uplink sub-time interval 615-*a* to the UE 115-*a* in TTI 505-*e*. In this example, the base station 105-*a* determines a time duration 650-*a* after which the grant is usable by the UE 115-*a* based at least in part on the one or more UE capabilities or one or more characteristics of the grant. In this example, the time duration 650-*a* is longer than a duration of TTI 505-*d* but shorter than two consecutive TTIs. The base station 105-*a* may thus use grant 620-*a* in TTI 505-*d* to assign to the UE 115-*a* one or more uplink sub-time intervals within a next TTI (e.g., TTI 505-*e*), so long as the uplink sub-time intervals occur after time duration 650-*a*. In some instances, the time duration 650 may span two or more TTIs, and the base station 105-*a* may use the time duration of however many TTIs to determine when the grant 620 is usable by the UE 115-*a*.

The base station 105-*a* may determine the time duration 650 in a number of different ways. For instance, the base station 105-*a* may select the time duration 650 from multiple time durations of varying length corresponding to different one or more UE capabilities, different one or more grant characteristics, or any combination thereof. In some examples, the time duration 650 may be in terms of time, one or more mini-slots, one or more slots, one or more subframes, or a combination thereof. In some instances, the base station 105-*a* may identify the time duration 650 based at least in part on whether the grant 620 includes a timing adjustment to be applied by the UE 115-*a*, or a beam indication, or a beam-change indication, or a bandwidth-part indication, or a bandwidth-part change indication, or any combination thereof. The timing adjustment may correspond to an amount of time a signal takes to wirelessly propagate between the base station 105-*a* and the UE 115-*a*, and may be adjusted based at least in part on a current relative geographic distance between the base station 105-*a* and the UE 115-*a*. The UE 115-*a* may use the timing adjustment to maintain synchronization with the base station 105-*a* to enable decoding of downlink sub-time intervals and for transmitting to the base station 105-*a* at the respective proper times.

The time duration 650 may also be a function of a configuration of a sub-time interval (e.g., slot configuration). In some examples, a slot may have a downlink centric configuration or an uplink centric configuration. In other examples, a configuration for a slot may specify a predetermined range of OFDM symbols for downlink (DL) control, one or more sounding reference signals (SRSs) at the beginning of an uplink portion of the slot, or combinations thereof. Based at least in part on one or more of these factors, the base station 105-*a* may generate a grant 620 including an assignment of resources to the UE 115-*a* based at least in part on when the grant 620 is usable by the UE 115-*a*.

Referring again to FIG. 3, at 315, the base station 105-*a* may transmit the grant to the UE 115-*a*. Within time period 320, the UE 115-*a* may process the grant and take an action upon the grant. The time period 320 may be the same as or longer than the time duration 650 after which the grant is usable by the UE 115-*a* as determined by the base station 105-*a*. At 325, the base station 105-*a* and the UE 115-*a* may communicate in accordance with the resources assigned in the grant 620. In some examples, the grant 620 may correspond to a resource assignment for a single TTI or for multiple TTIs.

UE capabilities may vary over time and the UE 115-*a* may dynamically signal an indication to the base station 105-*a* to indicate which of the one or more UE capabilities to use for grant generation. Rather than having to transmit a large amount of data or retransmit the entire capability table 500 or significant portion thereof, the UE 115-*a* may signal an indication that includes one or more indices from the capability table 500. In FIG. 4, for example, the UE 115-*a* may associate different UE capabilities sets with a grant having the same characteristic (e.g., set 420-*c* and 420-*d* are common to grant characteristic (GC3)). Set 420-*c* may be used when a battery level of the UE 115-*a* satisfies a threshold (e.g., meets or exceeds the threshold), and set 420-*d* may be used when a battery level of the UE 115-*a* does not satisfy a threshold (e.g., below the threshold). In other examples, the UE 115-*a* may use different UE capability sets 420 based at least in part on currently available processing capabilities, currently available decoding capabilities, and/or the like.

The UE 115-*a* may also determine when to dynamically signal the indication based at least in part on a history of at least one of one or more timing adjust durations received by the UE 115-*a*, one or more hybrid automatic repeat request (HARQ) acknowledgements or negative acknowledgements received by the UE for uplink data previously transmitted by the UE 115-*a* to the base station 105-*a*, or any combination thereof.

At 330, the UE 115-*a* may select an index from the capability table 500 and may transmit, at 335, to the base station 105-*a* an indication of the selected index. For example, the UE 115-*a* may transmit the indication in an uplink control channel (e.g., Physical Uplink Control Channel (PUCCH)). The UE 115-*a* may transmit the indication to dynamically indicate, for example, which index is active. The base station 105-*a* may process the selected index to associate one or more grant characteristics with one or more UE capabilities when generating a grant.

At some time, the base station 105-*a* may desire to generate a grant having the one or more grant characteristics associated with the selected index. The base station 105-*a* may use the capability table 500 to retrieve the one or more UE capabilities associated with the one or more grant characteristics. The base station 105-*a* may assign resources to the UE 115-*a* in a manner similar to that discussed at 310, above, again determining when the grant to be transmitted will be usable by the UE 115-*a*.

At 340, the base station 105-*a* may generate a grant having the one or more characteristics, and the grant may assign uplink resources, downlink resources, or both, to the UE 115-*a*. At 345, the base station 105-*a* may transmit the grant to the UE 115-*a*. Within time period 350, the UE 115-*a* may process the grant and take an action upon the grant. The time period 350 may be the same as or longer than the time duration 650 after which the grant is usable by the UE 115-*a* as determined by the base station 105-*a*. At 355, the base station 105-*a* and the UE 115-*a* may communicate in accordance with the resource assignment indicated in the grant.

Figure 7:
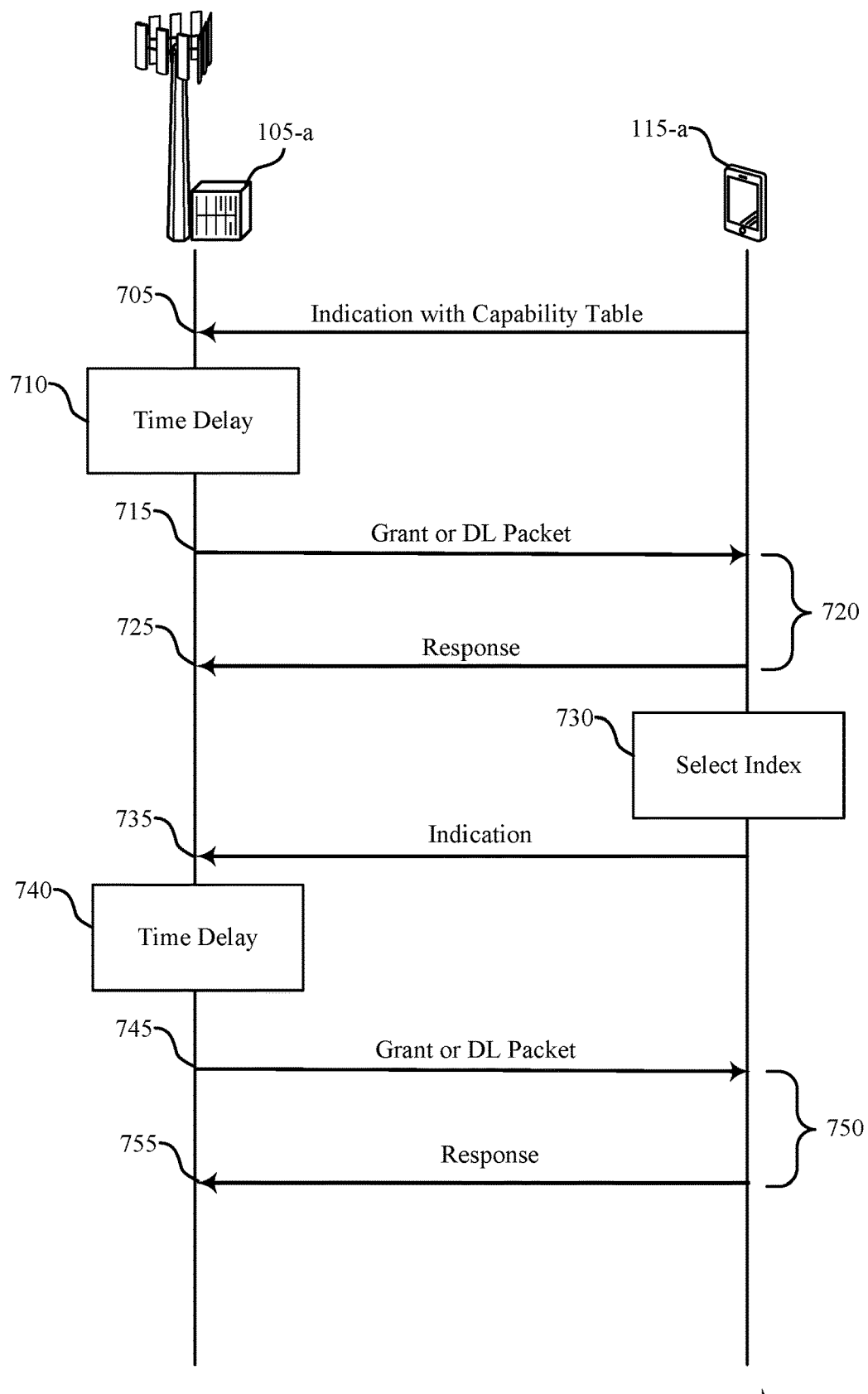
FIG. 7 illustrates an example of a process flow that supports improved scheduling and/or scheduling configuration in accordance with aspects of the present disclosure.

The base station 105-*a* may also take into account capabilities of the UE 115-*a* when determining when to expect the UE 115-*a* to reply to a transmission. FIG. 7 illustrates an example of a process flow 700 that supports improved scheduling and/or scheduling configuration in accordance with various aspects of the present disclosure.

In some instances, a base station 105-*a* may transmit a message to the UE 115-*a* and expect the UE 115-*a* to respond within a defined amount of time. UEs, however, may have different processing capabilities and different processing availability, and thus may not all be able to respond within the same amount of time. For example, the base station 105-*a* and the UE 115-*a* may use a HARQ procedure. In HARQ, a transmitter sends data and the receiver has a predetermined amount of time to send an ACK or a NACK. The ACK indicates that the transmitted data was successfully received, and the NACK indicates that it was not. If a NACK is received or neither an ACK or NACK is received within the defined amount of time, the transmitter resends the data. In many instances, varying UE capabilities means that requiring all UEs to respond with an ACK or NACK within the same time period is not feasible or practical. Due to the variability in UE capabilities, the base station 105-*a* may set when a UE is expected to respond based at least in part on capabilities of the UE.

The process flow 700 may begin at 705. At 705, UE 115-*a* may build a capability table and transmit an indication that includes the capability table to the base station 105-*a*. FIG. 8 illustrates an example of a capability table 800 that supports improved scheduling and/or scheduling configuration in accordance with various aspects of the present disclosure. The capability table 800 may include similar information as in capability table 400, but includes time delay information instead of (or in addition to) one or more grant characteristics. In the depicted example, the capability table 500 may include rows 820-*a* to 820-*d* that list combinations 810 of one or more UE capabilities and time delay information mapped to an index 805. The time delay information may provide an estimate of how long it will take the UE 115-*a* to respond. The indication may also indicate which one or ones of the indices are currently active for the UE 115-*a*, and which one or more indices are inactive and may not be used. For example, battery level, available processing resources, and/or the like may be used to control how quickly the UE 115-*a* is capable of responding. The base station 105-*a* may receive and store the capability table 800, and use the one or more currently active indices for setting a time delay.

At 710, the base station 105-*a* may identify data to transmit to the UE 115-*a* and determine the time delay of when to expect a response to the data from the UE 115-*a*. The time delay may be in terms of time delay in terms of at least one of time, one or more mini-slots, one or more slots, or one or more subframes. The base station 105-*a* may identify the time delay based at least in part on a configuration of a wireless communications frame structure or slot in which the DL packet or the grant is to be transmitted, a configuration of a predetermined number of wireless communication frame structures or slots which follow transmission of the grant, or combinations thereof. In some examples, the time delay may be based at least in part on whether the wireless communications frame structure or slot is of a downlink (DL) centric configuration or an UL centric configuration. In further examples, the time delay may be based on whether the wireless communications frame structure or slot includes a predetermined range of OFDM symbols for downlink (DL) control, one or more SRSs at the beginning of an uplink portion of the slot, or combinations thereof.

At 715, the base station 105-*a* may transmit a grant, a DL packet, and/or the like to the UE 115-*a*. The base station 105-*a* may also set a retransmission timer corresponding to the identified time delay. The base station 105-*a* may determine that the retransmission timer expires if an amount of time elapses that meets or exceeds the time delay before receiving a response from the UE 115-*a*. In some instances, the retransmission timer may be set to expire at least a predetermined amount of time that exceeds the time delay to account for processing delays or other factors. Time window 720 in FIG. 7 may correspond to when the UE 115-*a* is expected to receive the grant or DL packet and transmit a response. In some instances, the UE 115-*a* successfully receives and decodes the grant or DL packet, and timely sends a response (e.g., an ACK) at 725. In other instances, the UE 115-*a* receives a transmission from the base station 105-*a*, but is unable to properly decode the transmission, and timely sends a response (e.g., a NACK) at 725. In some instances, the UE 115-*a* receives a transmission from the base station 105-*a* but does not timely respond, or does not receive the transmission and does not respond. In either scenario, the retransmission timer expires and the base station 105-*a* retransmits the grant or DL packet.

At 730, the UE 115-*a* may select an index from the capability table 500 and may transmit, at 735, to the base station 105-*a* an indication of the selected index. As UE capabilities may vary over time, the UE 115-*a* may dynamically signal an indication to the base station 105-*a* to indicate which of the one or more UE capabilities to use for determining the time delay. Rather than having to transmit a large amount of data or retransmit the entire capability table 800, the UE 115-*a* may signal an indication that includes one or more indices from the capability table 800.

In FIG. 8, for example, the UE 115-*a* may determine a current set of one or more UE capabilities, and select a desired index from the capability table 800. In an example, indices 3 and 4 correspond to different delay time information, but have a different set of UE capabilities. For instance, UE 115-*a* may signal different capabilities based at least in part on its battery level being within a particular range, with battery level 3 (BL3) corresponding to index 3 and battery level 4 corresponding to index 4. UE 115-*a* may dynamically signal index 3 to provide a shorter time delay (e.g., higher remaining battery charge), and index 4 to signal a longer delay (e.g., lower remaining battery charge). In other examples, the UE 115-*a* may select and dynamically signal different indices based at least in part on its currently available processing capabilities, currently available decoding capabilities, and/or the like.

The base station 105-*a* may process the selected index to identify one or more UE capabilities for determining the time delay based at least in part on the capability table 800.

At some time, the base station 105-*a* may desire to transmit a grant or a DL packet to the UE 115-*a*. The base station 105-*a* may use the capability table 500 to retrieve the one or more UE capabilities and the time delay information associated with the active index. The base station 105-*a* may, at 740, determine the time delay of when to expect a response from the UE 115-*a* in a manner similar to that discussed at 710, above.

At 745, the base station 105-*a* may transmit the grant or DL packet to the UE 115-*a*. Within time window 750, UE 115-*a* may or may not timely respond to the grant or DL packet. At 755, for example, the UE 115-*a* may send a response. If the response is received prior to a retransmission timer expires, the base station 105-*a* may determine, for example, that the grant or DL packet was successfully received. If the retransmission timer expires prior to receiving the response or no response is received, the base station 105-*a* may retransmit the grant or DL packet to the UE 115-*a*. The operations in process flow 700 may repeat one or more times.

Advantageously, the base station may efficiently utilize channel resources based on UE capabilities. Resources of the UE may also be efficiently utilized, and the examples herein provide a low-signaling overhead mechanism for dynamically indicating changes to the one or more UE capabilities.

Figure 9:
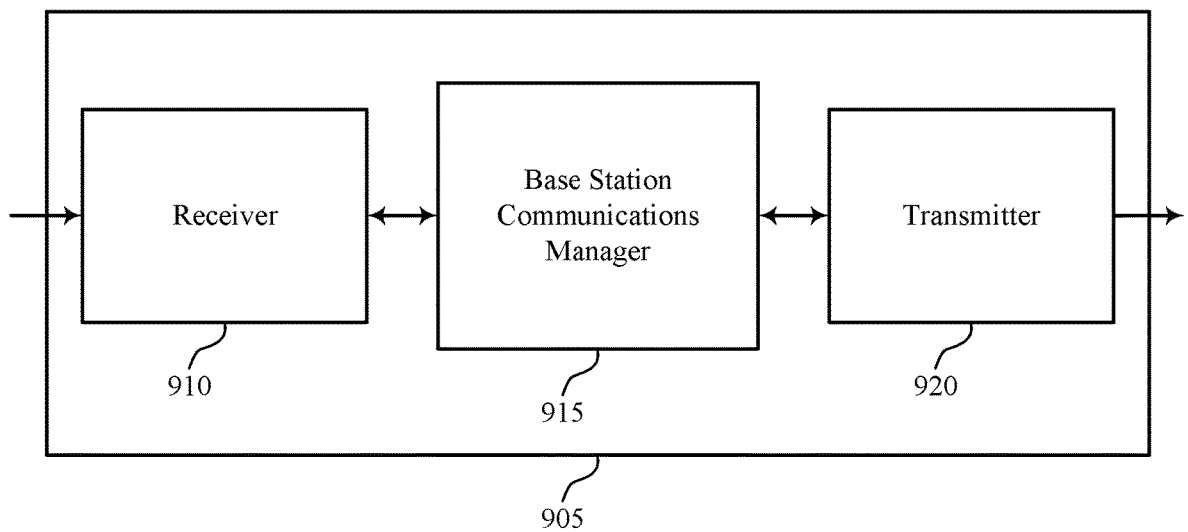
FIGS. 9 through 11 show block diagrams of a device that supports improved scheduling and/or scheduling configuration in accordance with aspects of the present disclosure.

FIG. 9 shows a block diagram 900 of a wireless device 905 that supports improved scheduling and/or scheduling configuration in accordance with various aspects of the present disclosure. Wireless device 905 may be an example of aspects of a base station 105 as described with reference to FIG. 1. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to improved scheduling and/or scheduling configuration, etc.). Information may be passed on to other components of the device. The receiver 910 may be an example of aspects of the transceiver 1235 described with reference to FIG. 12.

Base station communications manager 915 may be an example of aspects of the base station communications manager 1215 described with reference to FIG. 12.

Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may receive, from a user equipment (UE), an indication of one or more UE capabilities, determine, based on the one or more UE capabilities, when a grant to be transmitted by the base station to the UE is usable by the UE, and transmit the grant to the UE, the grant including an assignment of resources based on when the grant is usable. In aspects, a grant may be usable by a UE 115-*a* after the UE 115-*a* has successfully decoded the grant and/or may communicate (e.g., transmits or receive) using resources, such as time and/or frequency resources, allocated to the UE 115 in the grant. The base station communications manager 915 may also receive, from a UE, an indication of one or more UE capabilities, determine, based on the one or more UE capabilities, a time delay after which a downlink (DL) packet or a grant to be transmitted by the base station to the UE is to be responded to by the UE, and transmit at least one of the DL packet or the grant to the UE based on the indication of the time delay.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
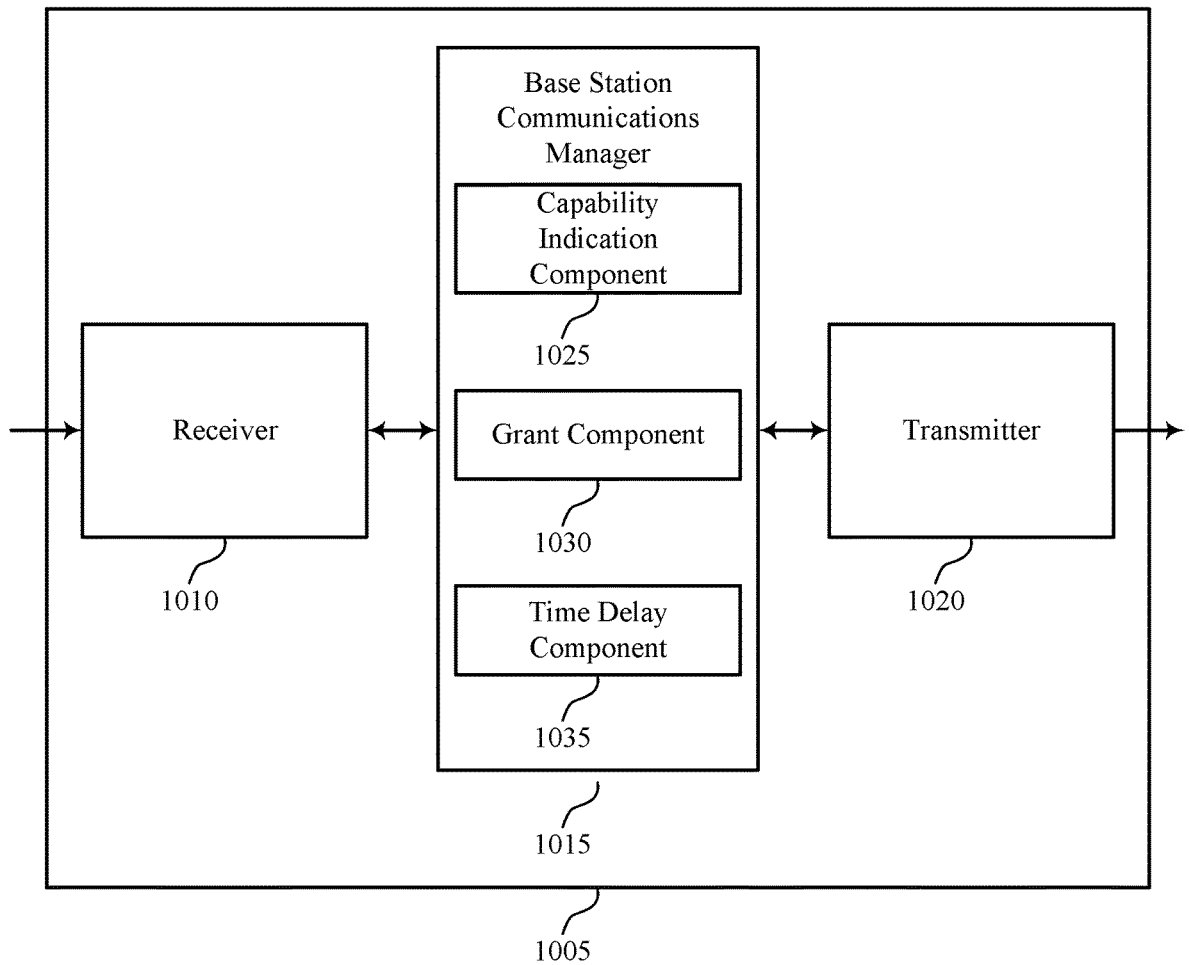

FIG. 10 shows a block diagram 1000 of a wireless device 1005 that supports improved scheduling and/or scheduling configuration in accordance with various aspects of the present disclosure. Wireless device 1005 may be an example of aspects of a wireless device 905 or a base station 105 as described with reference to FIGS. 1 and 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to improved scheduling and/or scheduling configuration, etc.). Information may be passed on to other components of the device. The receiver 1010 may be an example of aspects of the transceiver 1235 described with reference to FIG. 12.

Base station communications manager 1015 may be an example of aspects of the base station communications manager 1215 described with reference to FIG. 12.

Base station communications manager 1015 may also include capability indication component 1025, grant component 1030, and time delay component 1035.

Capability indication component 1025 may receive, from a UE, an indication of one or more UE capabilities, receive the indication of the one or more UE capabilities semi-statically in the form of a UE capability table, and receive the indication of the one or more UE capabilities dynamically using one or more indices in the UE capability table. In some cases, receiving the indication of the one or more UE capabilities further includes: receiving a capability table from the UE, where the capability table maps the one or more UE capabilities and one or more grant characteristics with an index. In some cases, receiving the indication of the one or more UE capabilities further includes: receiving a capability table from the UE, where the capability table maps UE capabilities and transmission delay times with an index.

Grant component 1030 may determine, based on the one or more UE capabilities, when a grant to be transmitted by the base station to the UE is usable by the UE and transmit the grant to the UE, the grant including an assignment of resources based on when the grant is usable.

Time delay component 1035 may determine, based on the one or more UE capabilities, a time delay after which a DL packet or a grant to be transmitted by the base station to the UE is to be responded to by the UE and transmit at least one of the DL packet or the grant to the UE based on the indication of the time delay. In some cases, a response by the UE to the DL packet or the grant is an acknowledgement or a negative acknowledgement. In some cases, determining the time delay includes: selecting the time delay in terms of at least one of time, one or more mini-slots, one or more slots, or one or more subframes. In some cases, determining the time delay includes: identifying the time delay based on a configuration of a wireless communications frame structure or slot in which the DL packet or the grant is to be transmitted, a configuration of a predetermined number of wireless communication frame structures or slots which follow transmission of the grant, or combinations thereof.

In some cases, the time delay is based on whether the wireless communications frame structure or slot is of a DL centric configuration or an UL centric configuration. In some cases, the time delay is based on whether the wireless communications frame structure or slot includes a predetermined range of OFDM symbols for DL control, one or more sounding reference signals (sounding reference signal (SRS)s) at the beginning of an uplink portion of the slot, or combinations thereof.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
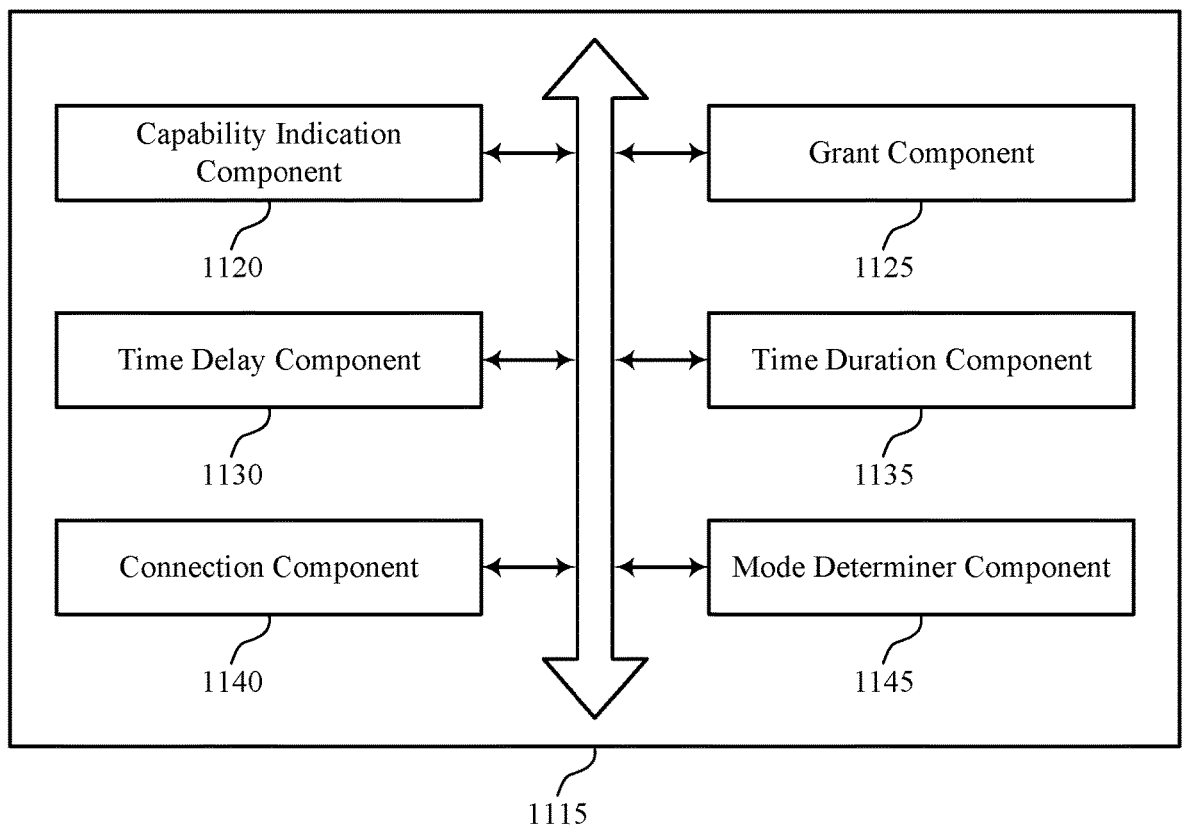

FIG. 11 shows a block diagram 1100 of a base station communications manager 1115 that supports improved scheduling and/or scheduling configuration in accordance with various aspects of the present disclosure. The base station communications manager 1115 may be an example of aspects of a base station communications manager 915, a base station communications manager 1015, or a base station communications manager 1215 described with reference to FIGS. 9, 10, and 12. The base station communications manager 1115 may include capability indication component 1120, grant component 1125, time delay component 1130, time duration component 1135, connection component 1140, and mode determiner component 1145. Each of these modules may communicate, directly or indirectly, with one another (e.g., via one or more buses).

Capability indication component 1120 may receive, from a UE, an indication of one or more UE capabilities, receive the indication of the one or more UE capabilities semi-statically in the form of a UE capability table, and receive the indication of the one or more UE capabilities dynamically using one or more indices in the UE capability table. In some cases, receiving the indication of the one or more UE capabilities further includes: receiving a capability table from the UE, where the capability table maps the one or more UE capabilities and one or more grant characteristics with an index. In some cases, receiving the indication of the one or more UE capabilities further includes: receiving a capability table from the UE, where the capability table maps UE capabilities and transmission delay times with an index.

Grant component 1125 may determine, based on the one or more UE capabilities, when a grant to be transmitted by the base station to the UE is usable by the UE and transmit the grant to the UE, the grant including an assignment of resources based on when the grant is usable.

Time delay component 1130 may determine, based on the one or more UE capabilities, a time delay after which a DL packet or a grant to be transmitted by the base station to the UE is to be responded to by the UE and transmit at least one of the DL packet or the grant to the UE based on the indication of the time delay. In some cases, a response by the UE to the DL packet or the grant is an acknowledgement or a negative acknowledgement. In some cases, determining the time delay includes: selecting the time delay in terms of at least one of time, one or more mini-slots, one or more slots, or one or more subframes. In some cases, determining the time delay includes: identifying the time delay based on a configuration of a wireless communications frame structure or slot in which the DL packet or the grant is to be transmitted, a configuration of a predetermined number of wireless communication frame structures or slots which follow transmission of the grant, or combinations thereof.

In some cases, the time delay is based on whether the wireless communications frame structure or slot is of a DL centric configuration or an UL centric configuration. In some cases, the time delay is based on whether the wireless communications frame structure or slot includes a predetermined range of OFDM symbols for DL control, one or more SRSs at the beginning of an uplink portion of the slot, or combinations thereof.

Time duration component 1135 may determine a time duration after receipt of the grant in which the grant is usable by the UE, select the time duration from a set of time durations corresponding to different at least one of the one or more UE capabilities or one or more grant characteristics, and determine when the grant is usable includes determining a time duration after receipt of the grant in which the grant is usable by the UE. In some cases, the time duration is in terms of at least one of time, one or more mini-slots, one or more slots, or one or more subframes. Time duration component 1135 may determine when the grant is usable including determining a time duration after receipt of the grant in which the grant is usable by the UE. In some cases, determining the time duration includes identifying the time duration based on whether the grant includes a timing adjustment to be applied by the UE, a beam indication, a beam-change indication, a bandwidth-part indication, a bandwidth-part change indication, or any combination thereof.

In some cases, determining when the grant is usable includes determining a time duration after receipt of the grant in which the grant is usable by the UE, and where determining the time duration includes identifying the time duration based on a configuration of a wireless communications frame structure or slot in which the grant is to be transmitted, a configuration of a predetermined number of wireless communication frame structures or slots which follow transmission of the grant, or combinations thereof. In some cases, the time duration is based on whether the wireless communications frame structure or slot is of a DL centric configuration or an UL centric configuration. In some cases, the time duration is based on whether the wireless communications frame structure or slot includes a predetermined range of OFDM symbols for DL control, one or more SRSs at the beginning of an uplink portion of the slot, or combinations thereof.

Connection component 1140 may receive the indication of the one or more UE capabilities semi-statically in a UE capability table, receive the indication of the one or more UE capabilities dynamically using one or more indices in the UE capability table, receive the indication of the one or more UE capabilities semi-statically in connection with a RRC connection setup procedure or an RRC reconfiguration procedure, receive the indication of the one or more UE capabilities dynamically via an UL control channel from the UE, and receive the indication of the one or more UE capabilities semi-statically in connection with RRC connection setup procedure or RRC reconfiguration procedure. In some cases, the indication of the one or more UE capabilities is based on a history of at least one of one or more timing adjust durations received by the UE, or one or more HARQ acknowledgements or negative acknowledgements received by the UE. In some cases, the indication of the one or more UE capabilities is based on a history of at least one of one or more timing adjust durations received by the UE, or one or more HARQ acknowledgements or negative acknowledgements received by the UE.

Mode determiner component 1145 may determine that the indication of the one or more UE capabilities is based on one of a processing mode of the UE, available battery power of the UE, or available processing resources of the UE. In some cases, the processing mode of the UE is either a low-latency mode or a relaxed-processing mode. In some cases, the indication of UE capability is based on at least one of a processing mode of the UE, available battery power of the UE, or available processing resources of the UE. In some cases, the processing mode of the UE is either a low-latency mode or a relaxed-processing mode.

Figure 12:
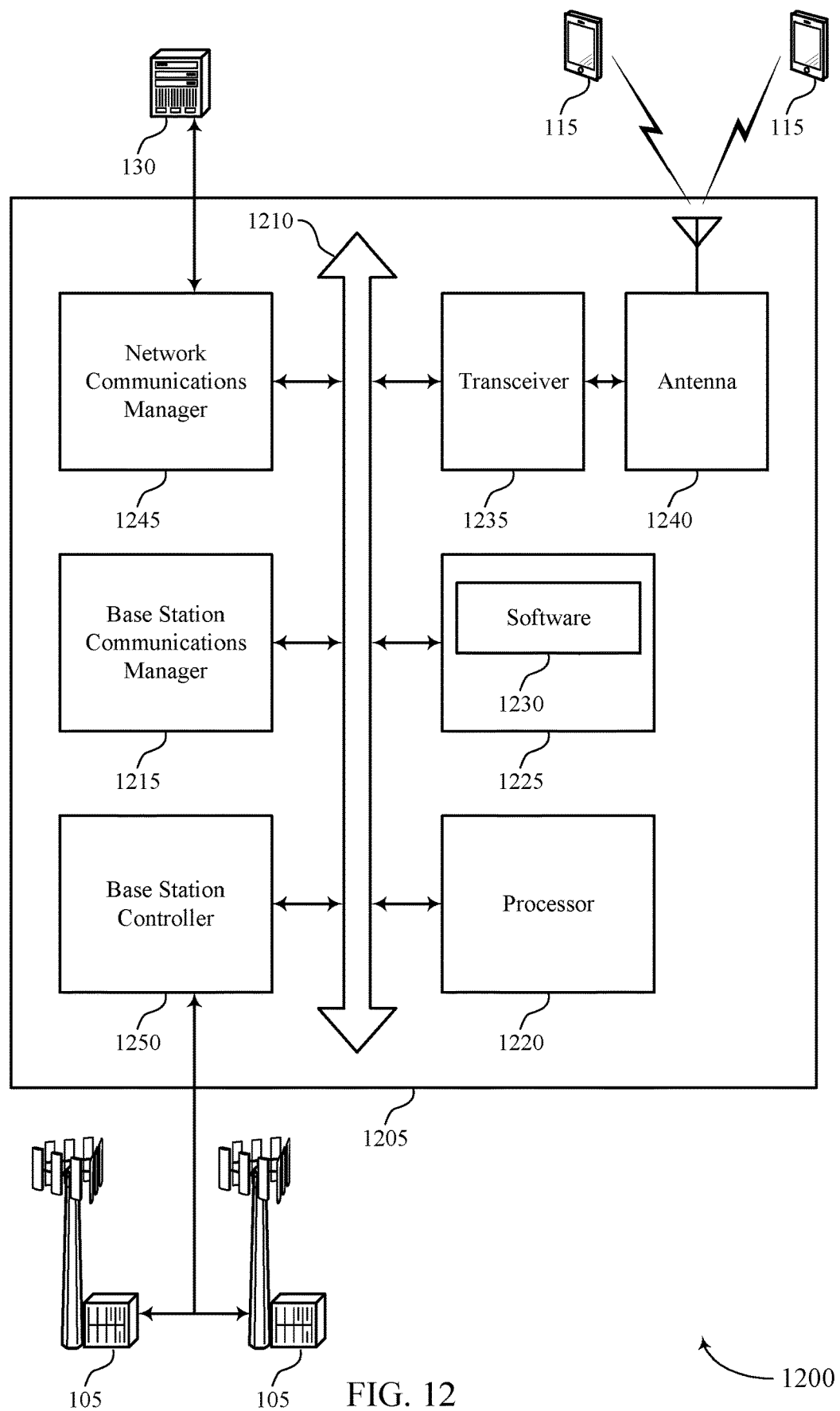
FIG. 12 illustrates a block diagram of a system including a base station that supports improved scheduling and/or scheduling configuration in accordance with aspects of the present disclosure.

FIG. 12 shows a diagram of a system 1200 including a device 1205 that supports improved scheduling and/or scheduling configuration in accordance with various aspects of the present disclosure. Device 1205 may be an example of or include the components of wireless device 905, wireless device 1005, or a base station 105 as described above, e.g., with reference to FIGS. 1, 9 and 10. Device 1205 may include components for bi-directional voice and data communications including components for transmitting and receiving communications, including base station communications manager 1215, processor 1220, memory 1225, software 1230, transceiver 1235, antenna 1240, network communications manager 1245, and base station controller 1250. These components may be in electronic communication via one or more busses (e.g., bus 1210). Device 1205 may communicate wirelessly with one or more UEs 115.

Base station communications manager 1215 may manage communications with other base station 105, and may include a controller or scheduler for controlling communications with UEs 115 in cooperation with other base stations 105. For example, the base station communications manager 1215 may coordinate scheduling for transmissions to UEs 115 for various interference mitigation techniques such as beamforming or joint transmission. In some examples, base station communications manager 1215 may provide an X2 interface within an Long Term Evolution (LTE)/LTE-A wireless communication network technology to provide communication between base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting improved scheduling and/or scheduling configuration).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware and/or software operation such as the interaction with peripheral components or devices.

Software 1230 may include code to implement aspects of the present disclosure, including code to support improved scheduling and/or scheduling configuration. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Base station controller 1250 may manage communications with other base station 105, and may include a controller or scheduler for controlling communications with UEs 115 in cooperation with other base stations 105. For example, the base station controller 1250 may coordinate scheduling for transmissions to UEs 115 for various interference mitigation techniques such as beamforming or joint transmission. In some examples, base station controller 1250 may provide an X2 interface within an LTE/LTE-A wireless communication network technology to provide communication between base stations 105.

Figure 13:
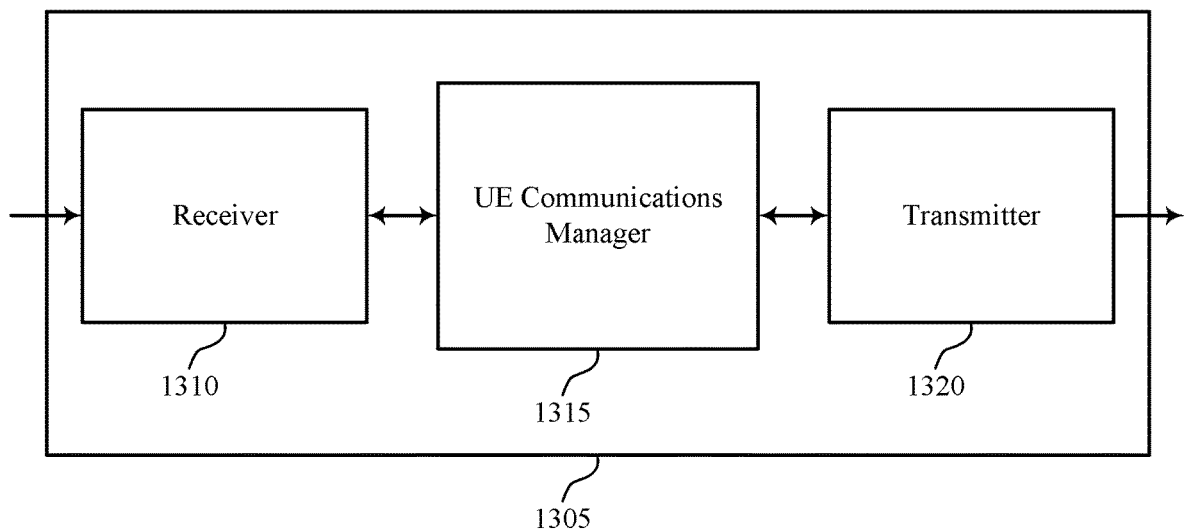
FIGS. 13 through 15 show block diagrams of a device that supports improved scheduling and/or scheduling configuration in accordance with aspects of the present disclosure.

FIG. 13 shows a block diagram 1300 of a wireless device 1305 that supports improved scheduling and/or scheduling configuration in accordance with various aspects of the present disclosure. Wireless device 1305 may be an example of aspects of a UE 115 as described with reference to FIG. 1. Wireless device 1305 may include receiver 1310, UE communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to improved scheduling and/or scheduling configuration, etc.). Information may be passed on to other components of the device. The receiver 1310 may be an example of aspects of the transceiver 1635 described with reference to FIG. 16.

UE communications manager 1315 may be an example of aspects of the UE communications manager 1615 described with reference to FIG. 16.

UE communications manager 1315 and/or at least some of its various sub-components may be implemented in hardware, software executed by a processor, firmware, or any combination thereof. If implemented in software executed by a processor, the functions of the UE communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1315 and/or at least some of its various sub-components may be physically located at various positions, including being distributed such that portions of functions are implemented at different physical locations by one or more physical devices.

In some examples, UE communications manager 1315 and/or at least some of its various sub-components may be a separate and distinct component in accordance with various aspects of the present disclosure. In other examples, UE communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1315 may identify one or more UE capabilities in association with different grant characteristics, transmit, to a base station, an indication of the one or more UE capabilities, and receive, from the base station, a grant having one of the different grant characteristics and including an assignment of resources, the assignment of resources based on the one or more UE capabilities.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may include a single antenna, or it may include a set of antennas.

Figure 14:
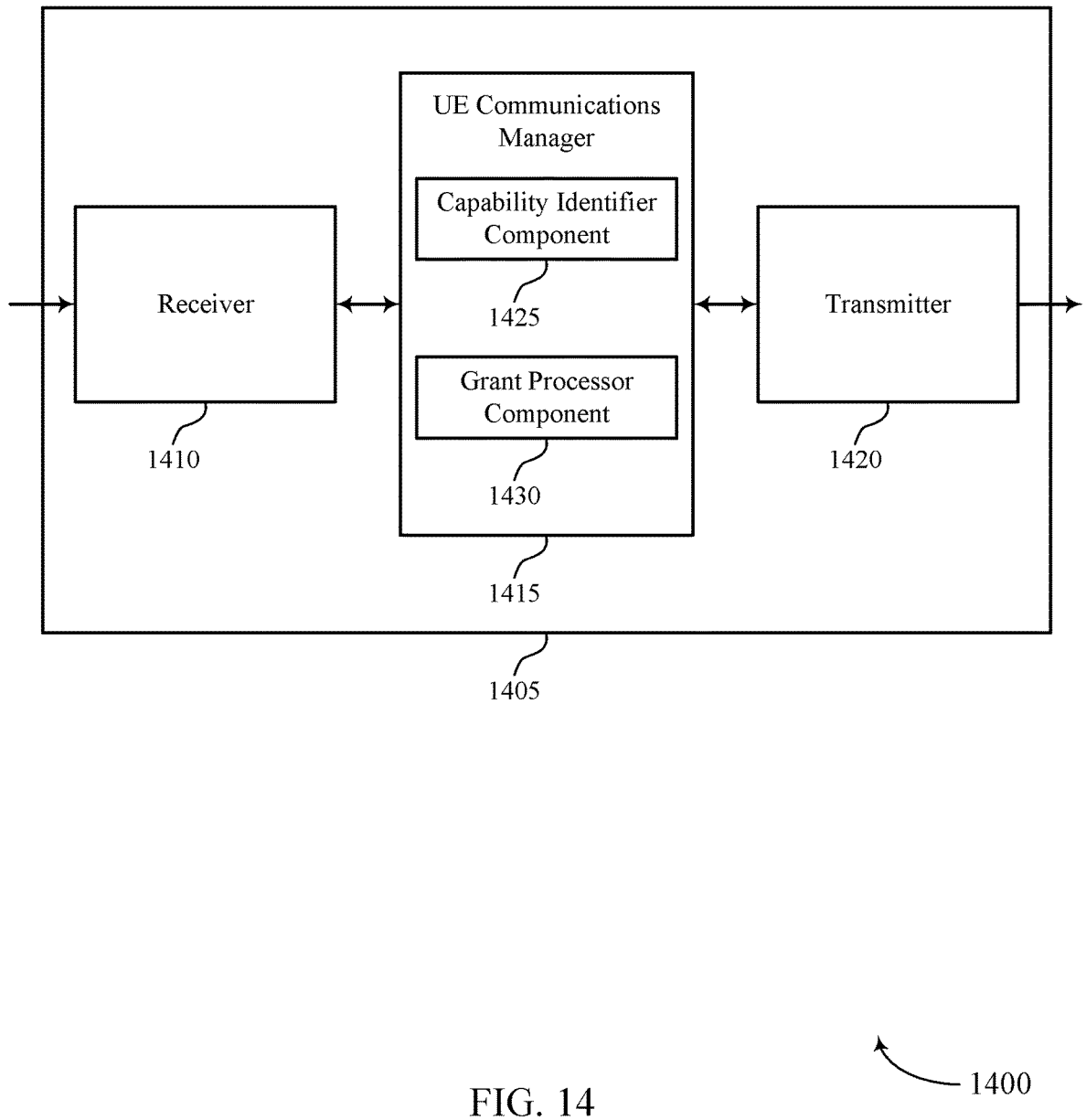

FIG. 14 shows a block diagram 1400 of a wireless device 1405 that supports improved scheduling and/or scheduling configuration in accordance with various aspects of the present disclosure. Wireless device 1405 may be an example of aspects of a wireless device 1305 or a UE 115 as described with reference to FIGS. 1 and 13. Wireless device 1405 may include receiver 1410, UE communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to improved scheduling and/or scheduling configuration, etc.). Information may be passed on to other components of the device. The receiver 1410 may be an example of aspects of the transceiver 1635 described with reference to FIG. 16.

UE communications manager 1415 may be an example of aspects of the UE communications manager 1615 described with reference to FIG. 16.

UE communications manager 1415 may also include capability identifier component 1425 and grant processor component 1430.

Capability identifier component 1425 may identify one or more UE capabilities in association with different grant characteristics and transmit, to a base station, an indication of the one or more UE capabilities.

Grant processor component 1430 may receive, from the base station, a grant having one of the different grant characteristics and including an assignment of resources, the assignment of resources based on the one or more UE capabilities. In some cases, the different grant characteristics include whether the grant includes a timing adjustment to be applied by the UE, or include a beam indication, a beam-change indication, a bandwidth-part indication, a bandwidth-part change indication, or any combination thereof. In some cases, the different grant characteristics include a configuration of a wireless communications frame structure or slot in which the grant is to be received.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may include a single antenna, or it may include a set of antennas.

Figure 15:
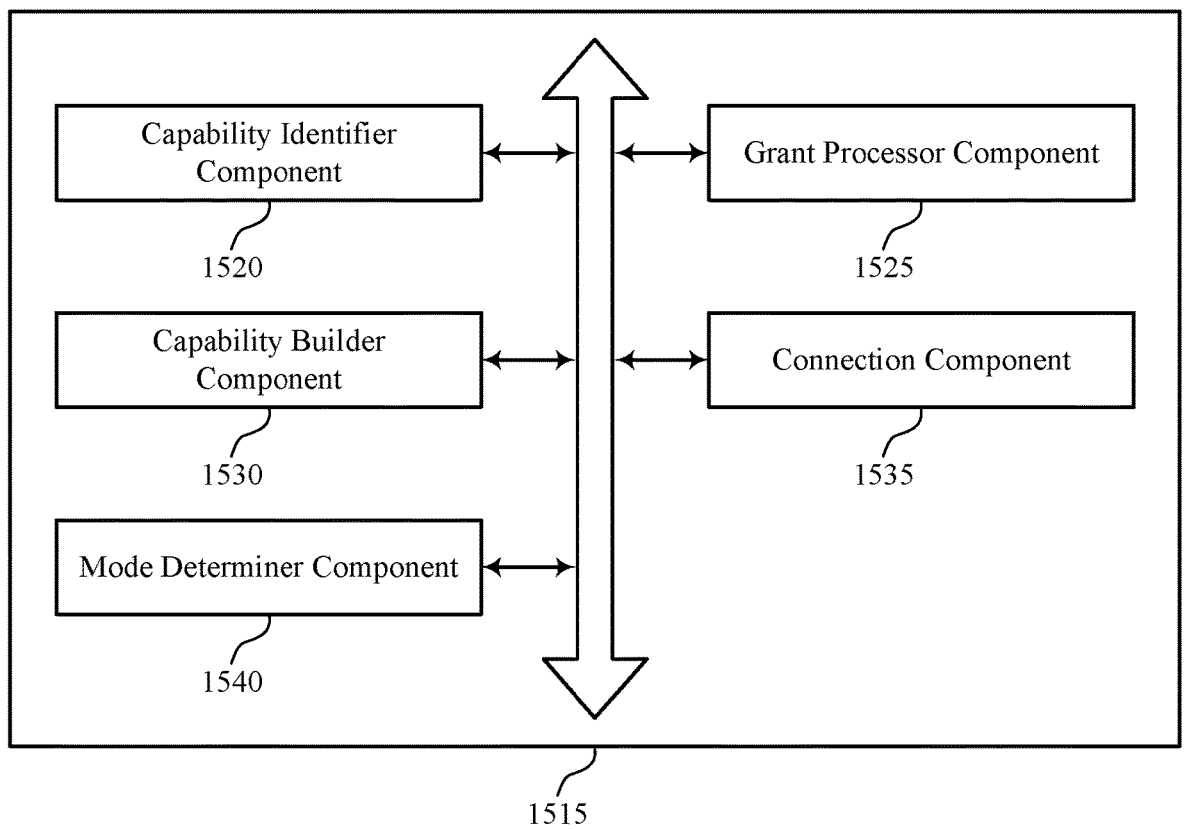

FIG. 15 shows a block diagram 1500 of a UE communications manager 1515 that supports improved scheduling and/or scheduling configuration in accordance with various aspects of the present disclosure. The UE communications manager 1515 may be an example of aspects of a UE communications manager 1615 described with reference to FIGS. 13, 14, and 16. The UE communications manager 1515 may include capability identifier component 1520, grant processor component 1525, capability builder component 1530, connection component 1535, and mode determiner component 1540. Each of these modules may communicate, directly or indirectly, with one another (e.g., via one or more buses).

Capability identifier component 1520 may identify one or more UE capabilities in association with different grant characteristics and transmit, to a base station, an indication of the one or more UE capabilities.

Grant processor component 1525 may receive, from the base station, a grant having one of the different grant characteristics and including an assignment of resources, the assignment of resources based on the one or more UE capabilities. In some cases, the different grant characteristics include whether the grant includes a timing adjustment to be applied by the UE. In some cases, the different grant characteristics include a configuration of a wireless communications frame structure or slot in which the grant is to be received.

Capability builder component 1530 may build a capability table, where the capability table maps UE capabilities and grant characteristics with an index and transmit the capability table to the base station as the indication of the UE capability. In some cases, the capability table includes a time when the UE is able to process a grant having one or more of the grant characteristics.

Connection component 1535 may transmit the indication of the one or more UE capabilities semi-statically in the form of a UE capability table, transmit the indication of the one or more UE capabilities dynamically using one or more indices in the UE capability table, transmit the indication of the one or more UE capabilities semi-statically in connection with RRC connection setup procedure or RRC reconfiguration procedure, and transmit the indication of the one or more UE capabilities dynamically via an UL control channel from the UE. In some cases, the indication of the one or more UE capabilities is based on a history of at least one of one or more timing adjust durations received by the UE, or one or more HARQ acknowledgements or negative acknowledgements received by the UE.

Mode determiner component 1540 may determine that the indication of the one or more UE capabilities is based on at least one of a processing mode of the UE, available battery power of the UE, or available processing resources of the UE. In some cases, the processing mode of the UE is either a low-latency mode or a relaxed-processing mode.

Figure 16:
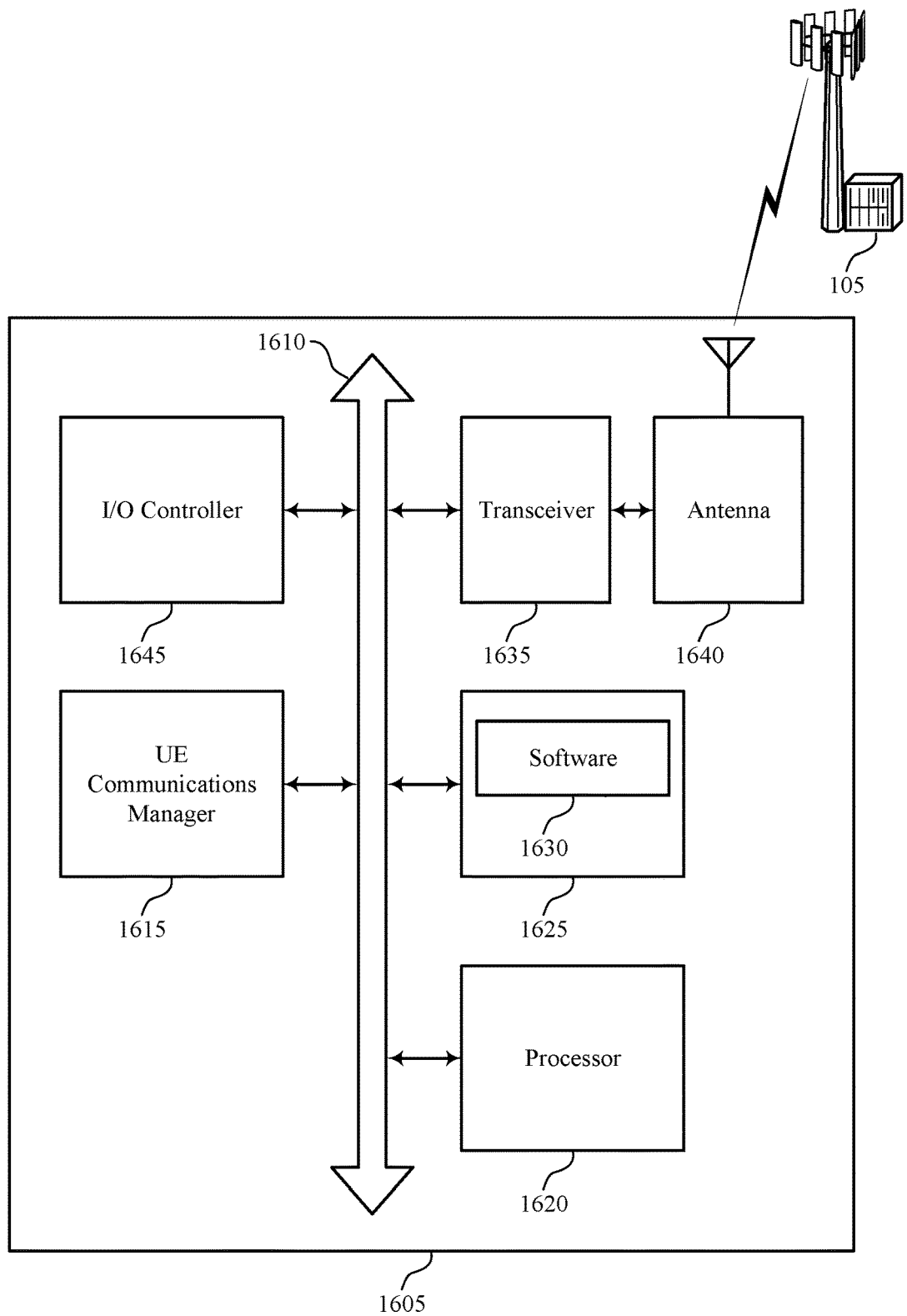
FIG. 16 illustrates a block diagram of a system including a UE that supports improved scheduling and/or scheduling configuration in accordance with aspects of the present disclosure.

FIG. 16 shows a diagram of a system 1600 including a device 1605 that supports improved scheduling and/or scheduling configuration in accordance with various aspects of the present disclosure. Device 1605 may be an example of or include the components of UE 115 as described above, e.g., with reference to FIG. 1. Device 1605 may include components for bi-directional voice and data communications including components for transmitting and receiving communications, including UE communications manager 1615, processor 1620, memory 1625, software 1630, transceiver 1635, antenna 1640, and I/O controller 1645. These components may be in electronic communication via one or more busses (e.g., bus 1610). Device 1605 may communicate wirelessly with one or more base stations 105.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting improved scheduling and/or scheduling configuration).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware and/or software operation such as the interaction with peripheral components or devices.

Software 1630 may include code to implement aspects of the present disclosure, including code to support improved scheduling and/or scheduling configuration. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

I/O controller 1645 may manage input and output signals for device 1605. I/O controller 1645 may also manage peripherals not integrated into device 1605. In some cases, I/O controller 1645 may represent a physical connection or port to an external peripheral. In some cases, I/O controller 1645 may utilize an operating system such as iOS®, ANDROID®, MS-DOS®, MS-WINDOWS®, OS/2®, UNIX®, LINUX®, or another known operating system. In other cases, I/O controller 1645 may represent or interact with a modem, a keyboard, a mouse, a touchscreen, or a similar device. In some cases, I/O controller 1645 may be implemented as part of a processor. In some cases, a user may interact with device 1605 via I/O controller 1645 or via hardware components controlled by I/O controller 1645.

Figure 17:
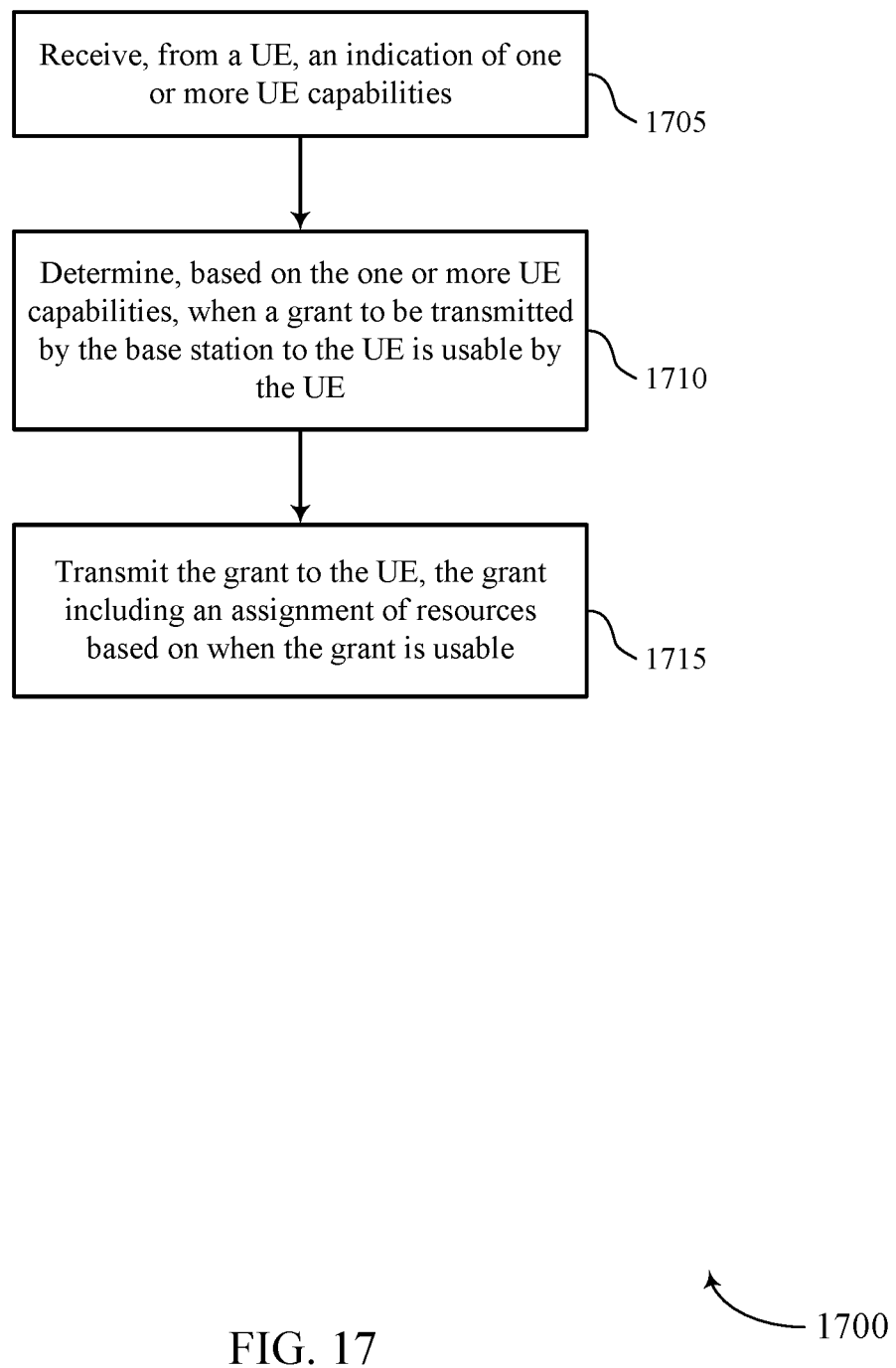
FIGS. 17 through 22 illustrate methods for improved scheduling and/or scheduling configuration in accordance with aspects of the present disclosure.

FIG. 17 shows a flowchart illustrating a method 1700 for improved scheduling and/or scheduling configuration in accordance with various aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may receive, from a UE, an indication of one or more UE capabilities. The operations of block 1705 may be performed according to the methods described with reference to FIGS. 1 through 8. In certain examples, aspects of the operations of block 1705 may be performed by a capability indication component as described with reference to FIGS. 9 through 12.

At block 1710 the base station 105 may determine, based at least in part on the one or more UE capabilities, when a grant to be transmitted by the base station to the UE is usable by the UE. The operations of block 1710 may be performed according to the methods described with reference to FIGS. 1 through 8. In certain examples, aspects of the operations of block 1710 may be performed by a grant component as described with reference to FIGS. 9 through 12.

At block 1715 the base station 105 may transmit the grant to the UE, the grant including an assignment of resources based at least in part on when the grant is usable. The operations of block 1715 may be performed according to the methods described with reference to FIGS. 1 through 8. In certain examples, aspects of the operations of block 1715 may be performed by a grant component as described with reference to FIGS. 9 through 12.

Figure 18:
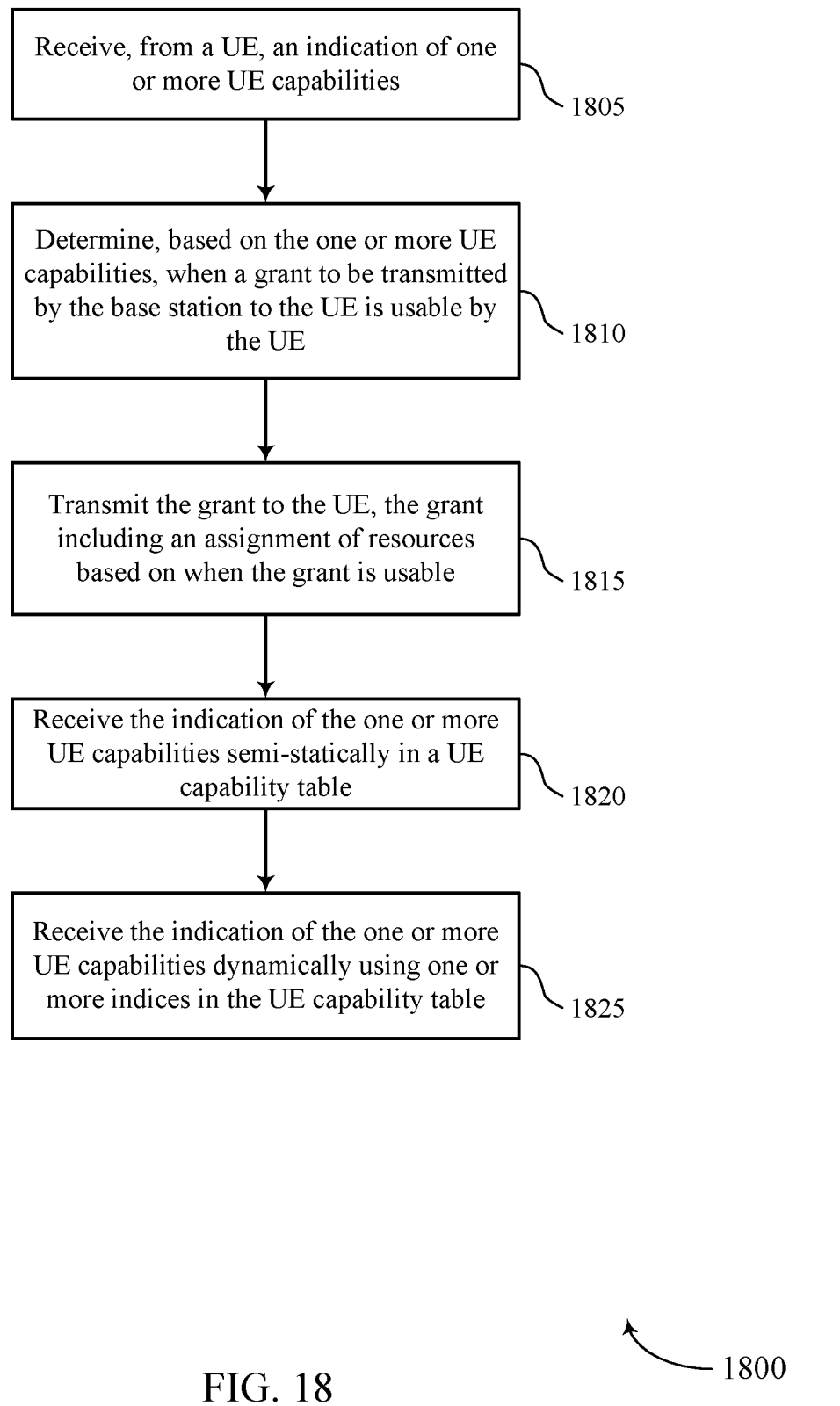

FIG. 18 shows a flowchart illustrating a method 1800 for improved scheduling and/or scheduling configuration in accordance with various aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may receive, from a UE, an indication of one or more UE capabilities. The operations of block 1805 may be performed according to the methods described with reference to FIGS. 1 through 8. In certain examples, aspects of the operations of block 1805 may be performed by a capability indication component as described with reference to FIGS. 9 through 12.

At block 1810 the base station 105 may determine, based at least in part on the one or more UE capabilities, when a grant to be transmitted by the base station to the UE is usable by the UE. The operations of block 1810 may be performed according to the methods described with reference to FIGS. 1 through 8. In certain examples, aspects of the operations of block 1810 may be performed by a grant component as described with reference to FIGS. 9 through 12.

At block 1815 the base station 105 may transmit the grant to the UE, the grant including an assignment of resources based at least in part on when the grant is usable. The operations of block 1815 may be performed according to the methods described with reference to FIGS. 1 through 8. In certain examples, aspects of the operations of block 1815 may be performed by a grant component as described with reference to FIGS. 9 through 12.

At block 1820 the base station 105 may receive the indication of the one or more UE capabilities semi-statically in a UE capability table. The operations of block 1820 may be performed according to the methods described with reference to FIGS. 1 through 8. In certain examples, aspects of the operations of block 1820 may be performed by a connection component as described with reference to FIGS. 9 through 12.

At block 1825 the base station 105 may receive the indication of the one or more UE capabilities dynamically using one or more indices in the UE capability table. The operations of block 1825 may be performed according to the methods described with reference to FIGS. 1 through 8. In certain examples, aspects of the operations of block 1825 may be performed by a connection component as described with reference to FIGS. 9 through 12.

Figure 19:
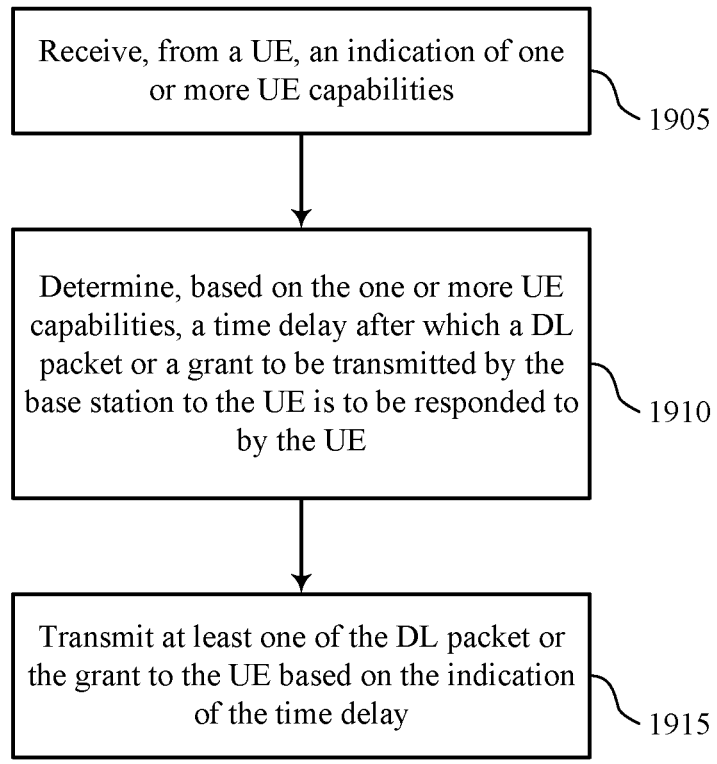

FIG. 19 shows a flowchart illustrating a method 1900 for improved scheduling and/or scheduling configuration in accordance with various aspects of the present disclosure. The operations of method 1900 may be implemented by a base station 105 or its components as described herein. For example, the operations of method 1900 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may receive, from a UE, an indication of one or more UE capabilities. The operations of block 1905 may be performed according to the methods described with reference to FIGS. 1 through 8. In certain examples, aspects of the operations of block 1905 may be performed by a capability indication component as described with reference to FIGS. 9 through 12.

At block 1910 the base station 105 may determine, based at least in part on the one or more UE capabilities, a time delay after which a downlink (DL) packet or a grant to be transmitted by the base station to the UE is to be responded to by the UE. The operations of block 1910 may be performed according to the methods described with reference to FIGS. 1 through 8. In certain examples, aspects of the operations of block 1910 may be performed by a time delay component as described with reference to FIGS. 9 through 12.

At block 1915 the base station 105 may transmit at least one of the DL packet or the grant to the UE based at least in part on the indication of the time delay. The operations of block 1915 may be performed according to the methods described with reference to FIGS. 1 through 8. In certain examples, aspects of the operations of block 1915 may be performed by a time delay component as described with reference to FIGS. 9 through 12.

Figure 20:
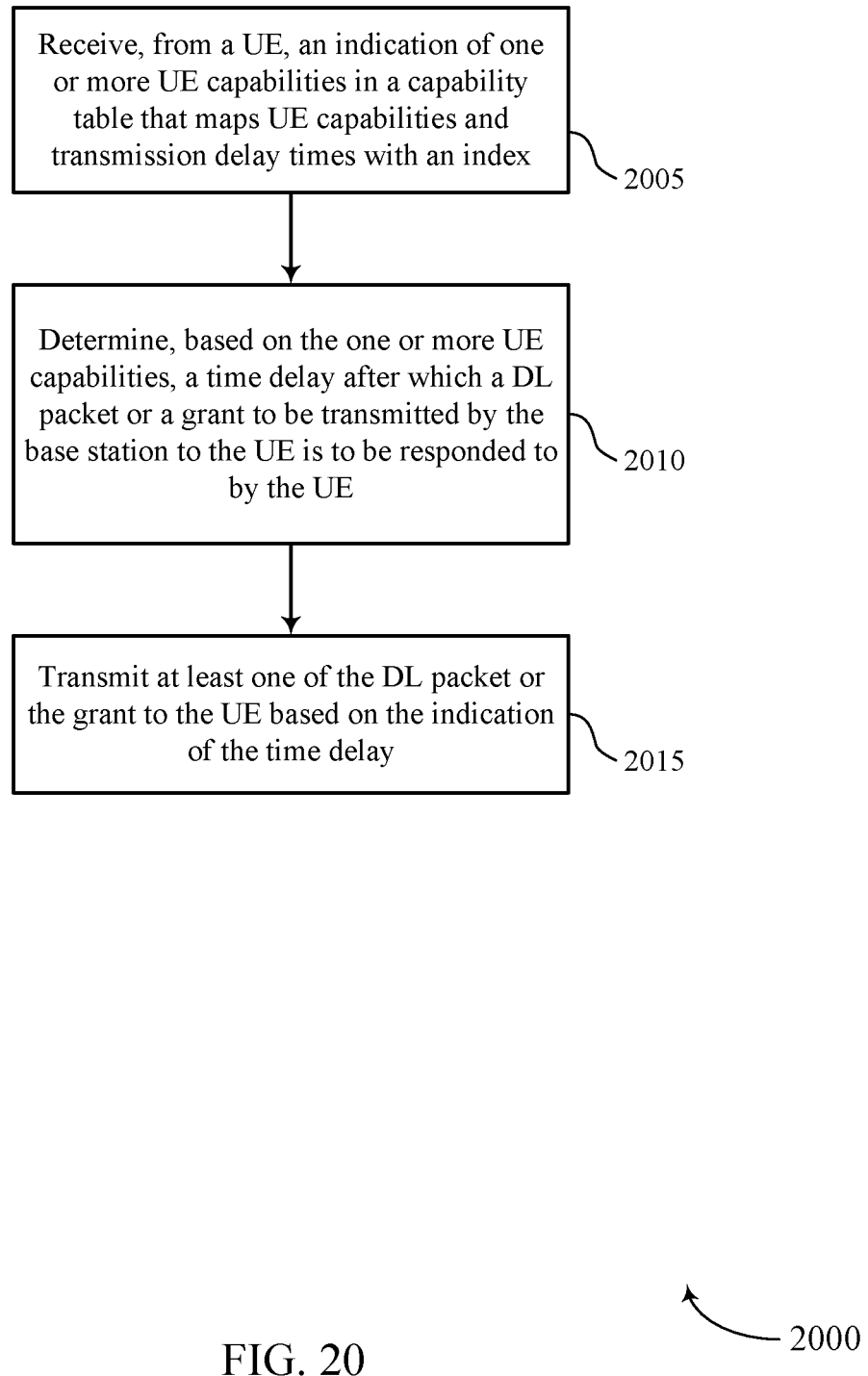

FIG. 20 shows a flowchart illustrating a method 2000 for improved scheduling and/or scheduling configuration in accordance with various aspects of the present disclosure. The operations of method 2000 may be implemented by a base station 105 or its components as described herein. For example, the operations of method 2000 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may receive, from a UE, an indication of one or more UE capabilities in a capability table that maps UE capabilities and transmission delay times with an index. The operations of block 2005 may be performed according to the methods described with reference to FIGS. 1 through 8. In certain examples, aspects of the operations of block 2005 may be performed by a capability indication component as described with reference to FIGS. 9 through 12.

At block 2010 the base station 105 may determine, based at least in part on the one or more UE capabilities, a time delay after which a downlink (DL) packet or a grant to be transmitted by the base station to the UE is to be responded to by the UE. The operations of block 2010 may be performed according to the methods described with reference to FIGS. 1 through 8. In certain examples, aspects of the operations of block 2010 may be performed by a time delay component as described with reference to FIGS. 9 through 12.

At block 2015 the base station 105 may transmit at least one of the DL packet or the grant to the UE based at least in part on the indication of the time delay. The operations of block 2015 may be performed according to the methods described with reference to FIGS. 1 through 8. In certain examples, aspects of the operations of block 2015 may be performed by a time delay component as described with reference to FIGS. 9 through 12.

Figure 21:
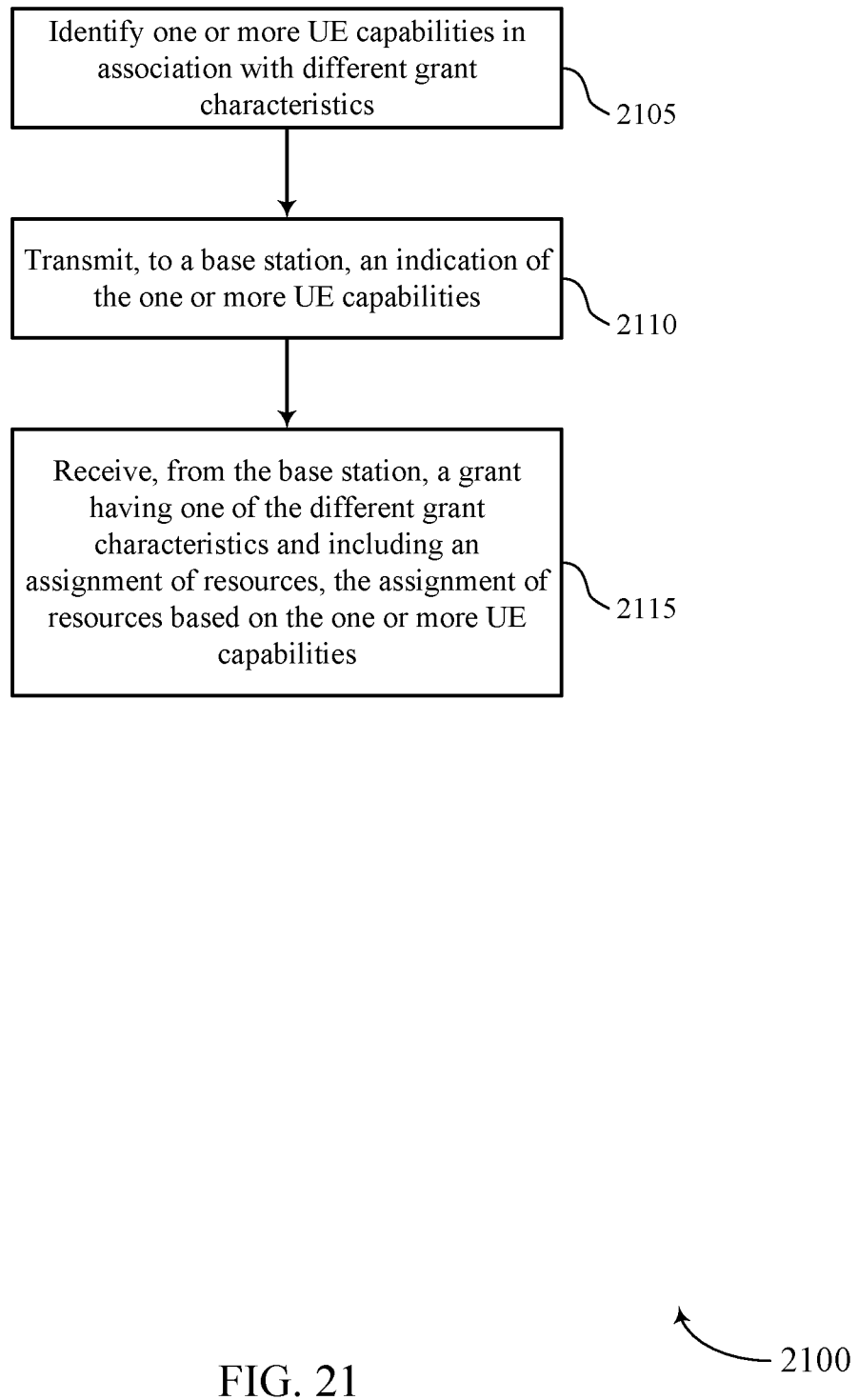

FIG. 21 shows a flowchart illustrating a method 2100 for improved scheduling and/or scheduling configuration in accordance with various aspects of the present disclosure. The operations of method 2100 may be implemented by a UE 115 or its components as described herein. For example, the operations of method 2100 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may identify one or more UE capabilities in association with different grant characteristics. The operations of block 2105 may be performed according to the methods described with reference to FIGS. 1 through 8. In certain examples, aspects of the operations of block 2105 may be performed by a capability identifier component as described with reference to FIGS. 13 through 16.

At block 2110 the UE 115 may transmit, to a base station, an indication of the one or more UE capabilities. The operations of block 2110 may be performed according to the methods described with reference to FIGS. 1 through 8. In certain examples, aspects of the operations of block 2110 may be performed by a capability identifier component as described with reference to FIGS. 13 through 16.

At block 2115 the UE 115 may receive, from the base station, a grant having one of the different grant characteristics and including an assignment of resources, the assignment of resources based at least in part on the one or more UE capabilities. The operations of block 2115 may be performed according to the methods described with reference to FIGS. 1 through 8. In certain examples, aspects of the operations of block 2115 may be performed by a grant processor component as described with reference to FIGS. 13 through 16. In aspects, the UE 115 may dynamically signal indications that identifies UE capabilities as they vary over time, for example, to a base station 105. The base station may transmit at least one of DL packets or grants to the UE 115 based at least in part on the indications of the time delay.

Figure 22:
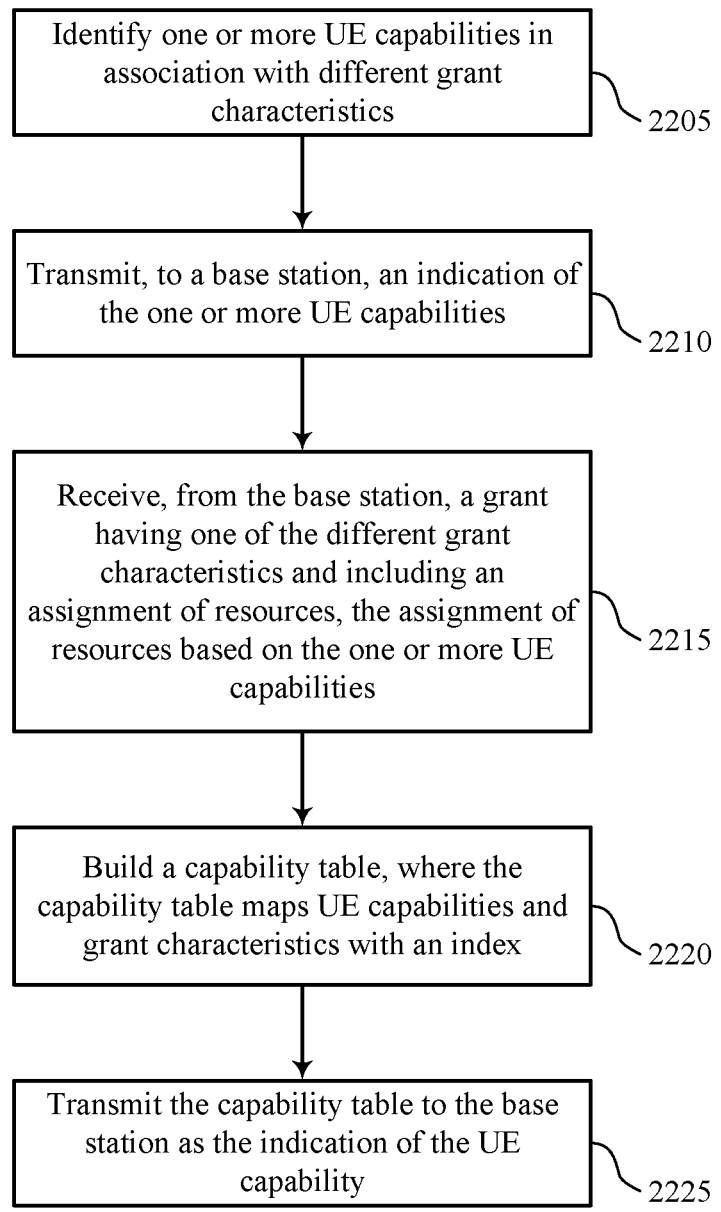

FIG. 22 shows a flowchart illustrating a method 2200 for improved scheduling and/or scheduling configuration in accordance with various aspects of the present disclosure. The operations of method 2200 may be implemented by a UE 115 or its components as described herein. For example, the operations of method 2200 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At block 2205 the UE 115 may identify one or more UE capabilities in association with different grant characteristics. The operations of block 2205 may be performed according to the methods described with reference to FIGS. 1 through 8. In certain examples, aspects of the operations of block 2205 may be performed by a capability identifier component as described with reference to FIGS. 13 through 16.

At block 2210 the UE 115 may transmit, to a base station, an indication of the one or more UE capabilities. The operations of block 2210 may be performed according to the methods described with reference to FIGS. 1 through 8. In certain examples, aspects of the operations of block 2210 may be performed by a capability identifier component as described with reference to FIGS. 13 through 16.

At block 2215 the UE 115 may receive, from the base station, a grant having one of the different grant characteristics and including an assignment of resources, the assignment of resources based at least in part on the one or more UE capabilities. The operations of block 2215 may be performed according to the methods described with reference to FIGS. 1 through 8. In certain examples, aspects of the operations of block 2215 may be performed by a grant processor component as described with reference to FIGS. 13 through 16.

At block 2220 the UE 115 may build a capability table, wherein the capability table maps UE capabilities and grant characteristics with an index. The operations of block 2220 may be performed according to the methods described with reference to FIGS. 1 through 8. In certain examples, aspects of the operations of block 2220 may be performed by a capability builder component as described with reference to FIGS. 13 through 16.

At block 2225 the UE 115 may transmit the capability table to the base station as the indication of the UE capability. The operations of block 2225 may be performed according to the methods described with reference to FIGS. 1 through 8. In certain examples, aspects of the operations of block 2225 may be performed by a capability builder component as described with reference to FIGS. 13 through 16.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a base station, comprising:
  receiving, from a user equipment (UE), an indication of one or more UE capabilities;
  determining, based at least in part on the one or more UE capabilities, when a grant to be transmitted by the base station to the UE is usable by the UE; and
  transmitting the grant to the UE, the grant including an assignment of resources based at least in part on when the grant is usable;
  wherein determining when the grant is usable includes determining a time duration after receipt of the grant in which the grant is usable by the UE, and wherein determining the time duration comprises identifying the time duration based at least in part on a configuration of a wireless communications frame structure or slot in which the grant is to be transmitted, a configuration of a predetermined number of wireless communication frame structures or slots which follow transmission of the grant, or combinations thereof.

2. The method of claim 1, wherein receiving the indication of the one or more UE capabilities further comprises:
  receiving a capability table from the UE, wherein the capability table maps the one or more UE capabilities and one or more grant characteristics with an index.

3. The method of claim 1, wherein determining when the grant is usable includes determining a time duration after receipt of the grant in which the grant is usable by the UE, the method further comprising:
  selecting the time duration from a plurality of time durations corresponding to different at least one of the one or more UE capabilities or one or more grant characteristics.

4. The method of claim 1, wherein determining when the grant is usable includes determining a time delay after which the UE is to respond to a downlink (DL) packet associated with the grant.

5. The method of claim 1, wherein determining when the grant is usable includes determining a time duration after receipt of the grant in which the grant is usable by the UE, and wherein the time duration is in terms of at least one of time, one or more mini-slots, one or more slots, or one or more subframes.

6. The method of claim 1, wherein determining when the grant is usable includes determining a time duration after receipt of the grant in which the grant is usable by the UE, and wherein determining the time duration comprises identifying the time duration based at least in part on whether the grant includes a beam indication, a beam-change indication, a bandwidth-part indication, a bandwidth-part change indication, or any combination thereof.

7. The method of claim 1, wherein the time duration is based at least in part on whether the wireless communications frame structure or slot is of a downlink (DL) centric configuration or an uplink (UL) centric configuration.

8. The method of claim 1, wherein the time duration is based at least in part on whether the wireless communications frame structure or slot includes a predetermined range of orthogonal frequency-division multiplexing (OFDM) symbols for downlink (DL) control, one or more sounding reference signals (SRSs) at the beginning of an uplink portion of the slot, or combinations thereof.

9. The method of claim 1, further comprising:
  receiving the indication of the one or more UE capabilities semi-statically in a UE capability table.

10. The method of claim 1, further comprising:
  receiving the indication of the one or more UE capabilities semi-statically in connection with a radio resource control (RRC) connection setup procedure or an RRC reconfiguration procedure.

11. The method of claim 1, further comprising:
  receiving the indication of the one or more UE capabilities via an uplink (UL) control channel from the UE.

12. The method of claim 1, wherein the indication of the one or more UE capabilities is based at least in part on a history of at least one of one or more timing adjust durations received by the UE, or one or more hybrid automatic repeat request (HARQ) acknowledgements or negative acknowledgements received by the UE.

13. The method of claim 1, wherein the indication of the one or more UE capabilities is based at least in part on one of a processing mode of the UE, available battery power of the UE, or available processing resources of the UE.

14. The method of claim 13, wherein the processing mode of the UE is either a low-latency mode or a relaxed-processing mode.

15. A method for wireless communication by a user equipment (UE), comprising:
- identifying one or more UE capabilities in association with different grant characteristics;
- transmitting, to a base station, an indication of the one or more UE capabilities; and
- receiving, from the base station, a grant having one of the different grant characteristics and including an assignment of resources, the assignment of resources based at least in part on the one or more UE capabilities
- wherein the different grant characteristics include a configuration of a wireless communications frame structure or slot in which the grant is to be received.

16. The method of claim 15, further comprising:
- building a capability table, wherein the capability table maps UE capabilities and grant characteristics with an index; and
- transmitting the capability table to the base station as the indication of a UE capability.

17. The method of claim 16, wherein the capability table includes a time when the UE is able to process a grant having one or more of the grant characteristics.

18. The method of claim 15, wherein the different grant characteristics include a beam indication, a beam-change indication, a bandwidth-part indication, a bandwidth-part change indication, or any combination thereof.

19. The method of claim 15, further comprising:
- transmitting the indication of the one or more UE capabilities semi-statically in a form of a UE capability table.

20. The method of claim 15, further comprising:
- transmitting the indication of the one or more UE capabilities semi-statically in connection with radio resource control (RRC) connection setup procedure or RRC reconfiguration procedure.

21. The method of claim 15, further comprising:
- transmitting the indication of the one or more UE capabilities via an uplink (UL) control channel from the UE.

22. The method of claim 15, wherein the indication of the one or more UE capabilities is based at least in part on a history of at least one of one or more timing adjust durations received by the UE, or one or more hybrid automatic repeat request (HARQ) acknowledgements or negative acknowledgements received by the UE.

23. The method of claim 15, wherein the indication of the one or more UE capabilities is based on at least one of a processing mode of the UE, available battery power of the UE, or available processing resources of the UE, and wherein the processing mode of the UE is either a low-latency mode or a relaxed-processing mode.

24. An apparatus for wireless communication, in a system comprising:
- a processor;
- memory in electronic communication with the processor; and
- instructions stored in the memory and operable, when executed by the processor, to cause the apparatus to:
  - receive, from a user equipment (UE), an indication of one or more UE capabilities;
  - determine, based at least in part on the one or more UE capabilities, when a grant to be transmitted by a base station to the UE is usable by the UE; and
  - transmit the grant to the UE, the grant including an assignment of resources based at least in part on when the grant is usable;
- wherein determining when the grant is usable includes determining a time duration after receipt of the grant in which the grant is usable by the UE, and wherein determining the time duration comprises identifying the time duration based at least in part on a configuration of a wireless communications frame structure or slot in which the grant is to be transmitted, a configuration of a predetermined number of wireless communication frame structures or slots which follow transmission of the grant, or combinations thereof.

25. The apparatus of claim 24, wherein determining when the grant is usable includes instructions executable by the processor to:
- determine a time delay after which the UE is to respond to a downlink (DL) packet associated with the grant.

26. The apparatus of claim 24, wherein the instructions are further executable by the processor to:
- determine a time duration after receipt of the grant in which the grant is usable by the UE; and
- select the time duration from a plurality of time durations corresponding to different at least one of the one or more UE capabilities or one or more grant characteristics.

27. An apparatus for wireless communication by a user equipment (UE), in a system comprising:
- a processor;
- memory in electronic communication with the processor; and
- instructions stored in the memory and operable, when executed by the processor, to cause the apparatus to:
  - identify one or more UE capabilities in association with different grant characteristics;
  - transmit, to a base station, an indication of the one or more UE capabilities; and
  - receive, from the base station, a grant having one of the different grant characteristics and including an assignment of resources, the assignment of resources based at least in part on the one or more UE capabilities,
- wherein the different grant characteristics include a configuration of a wireless communications frame structure or slot in which the grant is to be received.

28. The apparatus of claim 27, wherein the different grant characteristics include a beam indication, a beam-change indication, a bandwidth-part indication, a bandwidth-part change indication, or any combination thereof.

* * * * *